United States Patent
Takeda et al.

(10) Patent No.: US 11,792,735 B2
(45) Date of Patent: Oct. 17, 2023

(54) CLOSED LOOP FEEDBACK POWER CONTROL FOR MULTICAST TRANSMISSIONS

(71) Applicant: QUALCOMM Incorporated, San Diego, CA (US)

(72) Inventors: Kazuki Takeda, Tokyo (JP); Le Liu, Fremont, CA (US); Alberto Rico Alvarino, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/066,325

(22) Filed: Oct. 8, 2020

(65) Prior Publication Data

US 2021/0112499 A1    Apr. 15, 2021

Related U.S. Application Data

(60) Provisional application No. 62/914,873, filed on Oct. 14, 2019.

(51) Int. Cl.
  *H04W 52/08* (2009.01)
  *H04W 52/14* (2009.01)
  *H04W 4/06* (2009.01)

(52) U.S. Cl.
  CPC ............ *H04W 52/08* (2013.01); *H04W 4/06* (2013.01); *H04W 52/146* (2013.01)

(58) Field of Classification Search
  CPC ........... H04W 52/00–60; H04W 52/08; H04W 52/146; H04W 4/06
  See application file for complete search history.

(56) References Cited

U.S. PATENT DOCUMENTS

| | | | |
|---|---|---|---|
| 2004/0116150 A1* | 6/2004 | Yukie | H04M 1/724 455/556.1 |
| 2012/0036132 A1* | 2/2012 | Doyle | G06F 16/355 707/738 |

(Continued)

FOREIGN PATENT DOCUMENTS

| | | |
|---|---|---|
| EP | 3125583 A1 | 2/2017 |
| EP | 3528398 A1 | 8/2019 |

OTHER PUBLICATIONS

International Search Report and Written Opinion—PCT/US2020/055048—ISA/EPO—dated Jan. 21, 2021 (195601WO).

*Primary Examiner* — Raymond S Dean
(74) *Attorney, Agent, or Firm* — Holland & Hart LLP

(57) ABSTRACT

Methods, systems, and devices for wireless communications are described. A user equipment (UE) may be configured to receive a control message scheduling a multicast transmission, where the UE may identify a closed loop power control parameter for transmitting acknowledgment feedback responsive to the multicast transmission based on the multicast transmission transmitted to multiple UEs. The closed loop power control parameter may be indicated by a base station in a separate message than a downlink control information (DCI) scheduling the multicast transmission. For example, the base station may transmit the indication of the closed loop power control parameter in a group-transmit power control DCI or in a configuration for transmitting sounding reference signals. Additionally, the UE may adjust a transmit power for the acknowledgment feedback based on whether or not a DCI scheduling a retransmission is received in a time window after transmitting the acknowledgment feedback.

20 Claims, 21 Drawing Sheets

(56) References Cited

U.S. PATENT DOCUMENTS

| | | | |
|---|---|---|---|
| 2012/0044882 A1* | 2/2012 | Kim | H04W 72/0473 370/329 |
| 2012/0087334 A1* | 4/2012 | Suzuki | H04L 5/0091 370/329 |
| 2014/0023028 A1* | 1/2014 | Zhang | H04W 52/325 370/329 |
| 2014/0094216 A1* | 4/2014 | Park | H04W 24/08 455/522 |
| 2015/0223213 A1* | 8/2015 | Moon | H04W 52/40 370/329 |
| 2017/0353273 A1 | 12/2017 | Zhang et al. | |
| 2018/0077690 A1* | 3/2018 | Park | H04W 72/042 |
| 2018/0132272 A1* | 5/2018 | Sun | H04W 72/1289 |
| 2018/0199258 A1* | 7/2018 | Cezanne | H04B 7/0691 |
| 2018/0254872 A1* | 9/2018 | Seo | H04L 5/0055 |
| 2018/0279262 A1* | 9/2018 | Babaei | H04W 72/04 |
| 2019/0052332 A1* | 2/2019 | Shimezawa | H04B 7/0626 |
| 2019/0223205 A1* | 7/2019 | Papasakellariou | H04L 5/0044 |
| 2019/0261281 A1* | 8/2019 | Jung | H04W 52/16 |
| 2020/0337029 A1* | 10/2020 | Yi | H04L 5/0053 |
| 2021/0274327 A1* | 9/2021 | Zhao | H04W 72/1278 |

\* cited by examiner

CLOSED LOOP FEEDBACK POWER CONTROL FOR MULTICAST TRANSMISSIONS

CROSS REFERENCE

The present application for patent claims the benefit of U.S. Provisional Patent Application No. 62/914,873 by TAKEDA et al., entitled "CLOSED LOOP FEEDBACK POWER CONTROL FOR MULTICAST TRANSMISSIONS," filed Oct. 14, 2019, assigned to the assignee hereof, and expressly incorporated by reference herein.

BACKGROUND

The following relates generally to wireless communications, and more specifically to closed loop feedback power control for multicast transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some cases, a single base station may communicate with multiple UEs simultaneously. For example, the base station may multicast transmissions specifically to the multiple UEs out of all UEs within a coverage area of the base station. Additionally, the base station may configure each of the multiple UEs to transmit acknowledgment feedback for the multicast transmissions to indicate whether or not each UE successfully received and decoded the multicast transmissions. Improved techniques are desired for transmitting acknowledgment feedback for multicast transmissions.

SUMMARY

The described techniques relate to improved methods, systems, devices, and apparatuses that support closed loop feedback power control for multicast transmissions. Generally, the described techniques provide for a user equipment (UE) configured to receive a control message scheduling a multicast transmission to the UE, where the UE may identify a closed loop power control parameter for transmitting acknowledgment feedback responsive to the multicast transmission based on being scheduled with the multicast transmission to multiple UEs. In some cases, a base station may indicate the closed loop power control parameter to the UE in a separate message than a downlink control information (DCI) scheduling the multicast transmission, scheduling the acknowledgment feedback, or both. For example, the base station may transmit the indication of the closed loop power control parameter in a group-transmit power control (TPC) DCI (e.g., DCI format 2_2), in a configuration for the UE to transmit sounding reference signals (SRSs) (e.g., a TPC command or closed loop power control process for transmitting the SRSs is used for transmitting the acknowledgment feedback), or a combination thereof. Additionally or alternatively, the UE may adjust a transmit power for the acknowledgment feedback based on whether or not a DCI scheduling a retransmission is received in a time window after the acknowledgment feedback is transmitted.

A method of wireless communications is described. The method may include receiving, at a UE, a control message scheduling a multicast transmission to the UE; determining acknowledgement feedback for the multicast transmission at the UE; identifying, based on the multicast transmission being multicast to a set of UEs, a closed loop power control parameter for a feedback transmission to include the acknowledgment feedback; and transmitting the acknowledgement feedback in the feedback transmission in accordance with the closed loop power control parameter.

An apparatus for wireless communications is described. The apparatus may include a processor, memory coupled with the processor, and instructions stored in the memory. The instructions may be executable by the processor to cause the apparatus to receive, at a UE, a control message scheduling a multicast transmission to the UE; to determine acknowledgement feedback for the multicast transmission at the UE; to identify, based on the multicast transmission being multicast to a set of UEs, a closed loop power control parameter for a feedback transmission to include the acknowledgment feedback; and to transmit the acknowledgement feedback in the feedback transmission in accordance with the closed loop power control parameter.

Another apparatus for wireless communications is described. The apparatus may include means for receiving, at a UE, a control message scheduling a multicast transmission to the UE; means for determining acknowledgement feedback for the multicast transmission at the UE; means for identifying, based on the multicast transmission being multicast to a set of UEs, a closed loop power control parameter for a feedback transmission to include the acknowledgment feedback; and means for transmitting the acknowledgement feedback in the feedback transmission in accordance with the closed loop power control parameter.

A non-transitory computer-readable medium storing code for wireless communications is described. The code may include instructions executable by a processor to receive, at a UE, a control message scheduling a multicast transmission to the UE; to determine acknowledgement feedback for the multicast transmission at the UE; to identify, based on the multicast transmission being multicast to a set of UEs, a closed loop power control parameter for a feedback transmission to include the acknowledgment feedback; and to transmit the acknowledgement feedback in the feedback transmission in accordance with the closed loop power control parameter.

In some examples of the method, apparatuses, and non-transitory computer-readable medium described herein, identifying the closed loop power control parameter may include operations, features, means, or instructions for monitoring a group-TPC DCI message for the closed loop power control parameter, the group-TPC DCI message being different than a scheduling DCI for the acknowledgment feedback.

In some examples of the method, apparatuses, and non-transitory computer-readable medium described herein, identifying the closed loop power control parameter may include operations, features, means, or instructions for receiving a group-TPC DCI message and identifying a set of consecutive bits representative of a TPC value in the group-TPC DCI message, where the closed loop power control parameter may be the TPC value.

Some examples of the method, apparatuses, and non-transitory computer-readable medium described herein may further include operations, features, means, or instructions for receiving a starting position for the set of consecutive bits via radio resource control (RRC) signaling.

In some examples of the method, apparatuses, and non-transitory computer-readable medium described herein, the set of consecutive bits may include a configured number of bits, where the configured number of bits may be two (2) bits or three (3) bits.

Some examples of the method, apparatuses, and non-transitory computer-readable medium described herein may further include operations, features, means, or instructions for receiving an indication of the configured number of bits via RRC signaling.

In some examples of the method, apparatuses, and non-transitory computer-readable medium described herein, the set of consecutive bits in the DCI may be received based on a cyclic redundancy check (CRC) scrambled by a radio network temporary identifier (RNTI), the RNTI including a TPC physical uplink control channel (PUCCH) RNTI (TPC-PUCCH-RNTI), a group RNTI (G-RNTI), or a combination thereof.

In some examples of the method, apparatuses, and non-transitory computer-readable medium described herein, the group-TPC DCI message may include a DCI format 2_2.

Some examples of the method, apparatuses, and non-transitory computer-readable medium described herein may further include operations, features, means, or instructions for determining one or more closed loop power control processes to use for uplink control channels configured to carry the acknowledgment feedback for multicast transmissions, unicast transmissions, or both.

In some examples of the method, apparatuses, and non-transitory computer-readable medium described herein, the closed loop power control parameter may be applied to uplink control channels configured to carry the acknowledgment feedback for multicast transmissions, unicast transmissions, or both.

Some examples of the method, apparatuses, and non-transitory computer-readable medium described herein may further include operations, features, means, or instructions for receiving a configuration for transmitting SRSs, the configuration including a closed loop power control process for transmitting the SRSs, and applying the closed loop power control process for transmitting the SRSs to the acknowledgement feedback in the feedback transmission.

In some examples of the method, apparatuses, and non-transitory computer-readable medium described herein, identifying the closed loop power control parameter may include operations, features, means, or instructions for receiving a TPC command in an uplink grant for the SRSs, a DCI format, or a combination thereof, and identifying the TPC command for transmitting the acknowledgement feedback in the feedback transmission.

In some examples of the method, apparatuses, and non-transitory computer-readable medium described herein, the DCI format may be received based on a CRC scrambled by a TPC-SRS-RNTI.

In some examples of the method, apparatuses, and non-transitory computer-readable medium described herein, the closed loop power control process may be used for transmitting the acknowledgment feedback and the SRSs.

Some examples of the method, apparatuses, and non-transitory computer-readable medium described herein may further include operations, features, means, or instructions for transmitting the acknowledgment feedback for a unicast transmission to the UE, receiving the closed loop power control parameter in a DCI scheduling the unicast transmission, a separate DCI format for group-TPC, or a combination thereof, and applying the closed loop power control parameter to the acknowledgment feedback for the unicast transmission.

In some examples of the method, apparatuses, and non-transitory computer-readable medium described herein, transmitting the acknowledgement feedback in the feedback transmission may include operations, features, means, or instructions for transmitting a negative acknowledgment (NACK) for the acknowledgment feedback; monitoring for DCI within a time window, the DCI scheduling a retransmission for a same hybrid access response request (HARD) process associated with the acknowledgment feedback; and increasing a transmit power for a subsequent feedback transmission based on not receiving the DCI within the time window.

Some examples of the method, apparatuses, and non-transitory computer-readable medium described herein may further include operations, features, means, or instructions for receiving, via RRC signaling, an indication of the time window, an amount for the transmit power increase, or a combination thereof.

In some examples of the method, apparatuses, and non-transitory computer-readable medium described herein, transmitting the acknowledgement feedback in the feedback transmission may include operations, features, means, or instructions for transmitting a positive acknowledgment for the acknowledgment feedback; monitoring for DCI within a time window, the DCI scheduling a retransmission for a same HARQ process associated with the acknowledgment feedback; and increasing a transmit power for a subsequent feedback transmission based on receiving the DCI within the time window.

Some examples of the method, apparatuses, and non-transitory computer-readable medium described herein may further include operations, features, means, or instructions for receiving, via RRC signaling, an indication of the time window, an amount for the transmit power increase, or a combination thereof.

In some examples of the method, apparatuses, and non-transitory computer-readable medium described herein, an uplink control channel may carry the acknowledgment feedback for both multicast transmissions and unicast transmissions, and a closed loop power control process for the uplink control channel may be applied to either the multicast transmissions or the unicast transmissions.

In some examples of the method, apparatuses, and non-transitory computer-readable medium described herein, an uplink shared channel may carry the acknowledgment feedback for multicast transmissions, and a closed loop power control process for the uplink shared channel may be applied to the uplink shared channel.

A method of wireless communications is described. The method may include identifying a multicast transmission for a set of UEs; determining, based on the multicast transmission for the set of UEs, a closed loop power control parameter for feedback transmissions responsive to multicast transmissions; and transmitting, to the UEs, the multicast transmission and an indication of the closed loop power control parameter.

An apparatus for wireless communications is described. The apparatus may include a processor, memory coupled with the processor, and instructions stored in the memory. The instructions may be executable by the processor to cause the apparatus to identify a multicast transmission for a set of UEs; to determine, based on the multicast transmission for the set of UEs, a closed loop power control parameter for feedback transmissions responsive to multicast transmissions; and to transmit, to the UEs, the multicast transmission and an indication of the closed loop power control parameter.

Another apparatus for wireless communications is described. The apparatus may include means for identifying a multicast transmission for a set of UEs; means for determining, based on the multicast transmission for the set of UEs, a closed loop power control parameter for feedback transmissions responsive to multicast transmissions; and means for transmitting, to the UEs, the multicast transmission and an indication of the closed loop power control parameter.

A non-transitory computer-readable medium storing code for wireless communications is described. The code may include instructions executable by a processor to identify a multicast transmission for a set of UEs; to determine, based on the multicast transmission for the set of UEs, a closed loop power control parameter for feedback transmissions responsive to multicast transmissions; and to transmit, to the UEs, the multicast transmission and an indication of the closed loop power control parameter.

Some examples of the method, apparatuses, and non-transitory computer-readable medium described herein may further include operations, features, means, or instructions for transmitting the indication of the closed loop power control parameter in a group-TPC DCI format that may be separate from DCI scheduling the feedback transmissions.

Some examples of the method, apparatuses, and non-transitory computer-readable medium described herein may further include operations, features, means, or instructions for transmitting, via RRC signaling, an indication of a starting position for a set of consecutive bits in the group-TPC DCI format, where the set of consecutive bits conveys the closed loop power control parameter.

In some examples of the method, apparatuses, and non-transitory computer-readable medium described herein, the set of consecutive bits may include a configured number of bits, where the configured number of bits may be two (2) bits or three (3) bits.

Some examples of the method, apparatuses, and non-transitory computer-readable medium described herein may further include operations, features, means, or instructions for transmitting an indication of the configured number of bits via RRC signaling.

In some examples of the method, apparatuses, and non-transitory computer-readable medium described herein, the set of consecutive bits in the DCI may be transmitted based on a CRC scrambled by an RNTI, the RNTI including a TPC-PUCCH-RNTI, a G-RNTI, or a combination thereof.

In some examples of the method, apparatuses, and non-transitory computer-readable medium described herein, the group-TPC DCI format may include a DCI format 2_2.

Some examples of the method, apparatuses, and non-transitory computer-readable medium described herein may further include operations, features, means, or instructions for transmitting a configuration for the set of UEs to transmit SRSs including a closed loop power control process for transmitting the SRSs, where the closed loop power control parameter may be based on the closed loop power control process for transmitting the SRSs.

Some examples of the method, apparatuses, and non-transitory computer-readable medium described herein may further include operations, features, means, or instructions for transmitting a TPC command in an uplink grant for SRSs, a DCI format, or a combination thereof, where the closed loop power control parameter may be based on the TPC command.

DETAILED DESCRIPTION

Figure 1:
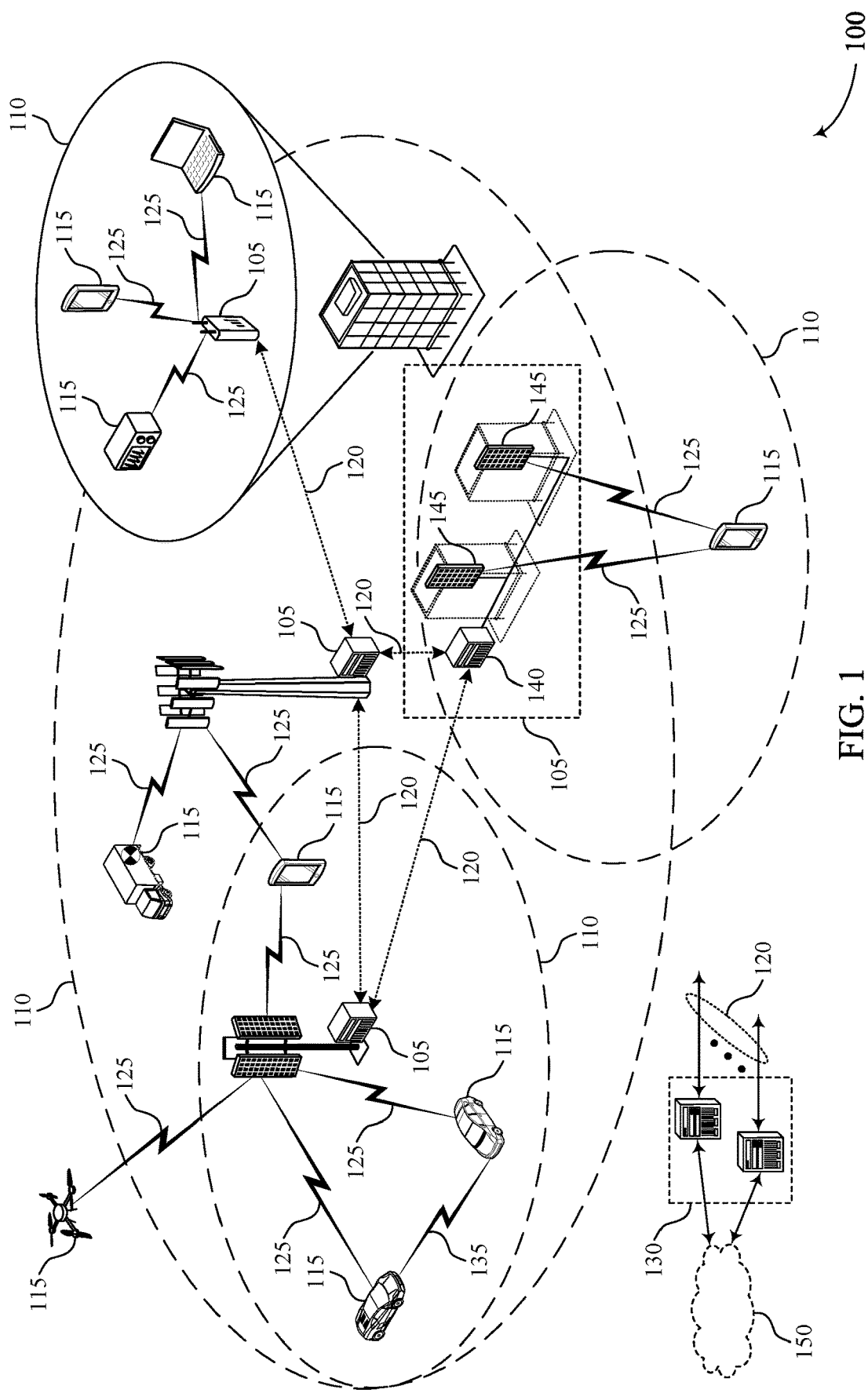
FIG. 1 illustrates an example of a system for wireless communications that supports closed loop feedback power control for multicast transmissions in accordance with aspects of the present disclosure.

In some wireless communications systems, a base station may send one or more multicast transmissions specifically to multiple user equipment (UEs) out of all UEs within a coverage area of the base station. Additionally, the base station may configure each of the multiple UEs to transmit acknowledgment feedback for the multicast transmissions to indicate whether or not each UE successfully received and decoded the multicast transmissions. In some cases, UE feedback for transmitting the acknowledgment feedback in response to the multicast transmissions may implement different techniques for power control. Conventionally, a transmit power control (TPC) command may be included in a scheduling downlink control information (DCI) for transmitting the acknowledgment feedback for the multicast transmissions. The TPC command in the scheduling DCI may be used by each or all of the receiving UEs for determining a power for transmitting the acknowledgment feedback. However, in some cases, it may be preferred to have different TPC command values across the multiple UEs receiving the multicast transmissions rather than a single TPC command transmitted in the scheduling DCI that is commonly monitored and can be used by any of the multiple UEs.

As described herein, when a UE is configured to receive multicast transmissions and to transmit acknowledgment feedback for the multicast transmissions, the UE may monitor a group-TPC DCI (e.g., DCI format 2_2) for a TPC command and not monitor for the TPC command included in the scheduling DCI. The group-TPC DCI may include a number of consecutive bits that a base station indicates for the UE to monitor for the TPC command. In some cases, the number of consecutive bits may be two (2) bits and correspond to larger values compared with existing TPC commands (e.g., from −3 to +6 decibels (dB) rather than −1 to +3 dB). Additionally or alternatively, the number of consecutive bits may be three (3) bits to include a higher number of possible TPC command values for the UE to use (e.g., eight (8) possible values with three (3) bits compared to four (4) possible values with the existing two (2) bits). This TPC command in the group-TPC DCI may be applied to any uplink control channel the UE transmits (e.g., uplink control channels for multicast transmissions, unicast transmissions, etc.). Additionally, a common closed loop power control process may be used for any of the uplink control channels, or separate closed loop power control processes may be used for uplink control channels carrying acknowledgment feedback for the multicast transmissions and for uplink control channels carrying acknowledgment feedback for the unicast transmissions.

In other examples, the UE may use a sounding reference signal (SRS) configuration when determining TPC commands (e.g., closed loop power control parameters) and closed loop power control processes for transmitting the acknowledgment feedback for the multicast transmissions. For example, the closed loop power control process for the SRSs may be applied to an uplink control channel carrying the acknowledgment feedback, or a TPC command for the SRSs received in an uplink grant may be used for the acknowledgment feedback, or a TPC command received in a separate DCI format (e.g., a DCI format 2_3) may be used for the acknowledgment feedback. In some cases, if the UE transmits a negative acknowledgment (NACK) message for the multicast transmission and does not receive a DCI scheduling a retransmission for a same access response request process (e.g., for the acknowledgment feedback) within a time window, the UE may increase the transmit power for subsequent uplink channel transmissions (e.g., for the acknowledgment feedback or a separate uplink transmission). Additionally or alternatively, if the UE transmits a positive acknowledgment (ACK) message for the multicast transmission and does receive a DCI scheduling a retransmission for the same access response request process within the time window, the UE may also increase the transmit power for subsequent uplink channel transmissions.

Aspects of the disclosure are initially described in the context of a wireless communications system. Additionally, aspects of the disclosure are illustrated by an additional wireless communications system, a unicast retransmission scheme, dynamic unicast/multicast configurations, a transmission power adjustment, and a process flow. Aspects of the disclosure are further illustrated by and described with reference to apparatus diagrams, system diagrams, and flowcharts that relate to closed loop feedback power control for multicast transmissions.

FIG. 1 illustrates an example of a wireless communications system 100 that supports open loop feedback power control for multicast transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE- SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval. As used herein, the term "acknowledgment feedback" may include or otherwise refer to HARQ acknowledgment (HARQ-ACK) feedback, ACK or NACK, ACK/NACK feedback, or other feedback responsive to a transmission intended for a receiving device.

In some examples of wireless communications system 100, a base station 105 may communicate with multiple UEs 115 simultaneously. For example, the base station 105 and UEs 115 may support a multicast service (e.g., multicast transmission, multicast data, multicast downlink), where the base station 105 transmits a message to multiple UEs 115 (e.g., via dedicated radio bearers, via radio bearers specific for multicast, via multicast radio bearers) rather than broadcasting the message to every UE 115 in a geographic coverage area 110 of the base station 105. Additionally or alternatively, the base station 105 may transmit the message to UEs 115 individually through unicast transmissions. In some cases, the base station 105 may send both multicast and unicast transmissions (e.g., based on multiplexing the transmissions in a TDM, FDM, and/or spatial division multiplexing (SDM) manner).

After receiving a multicast or unicast transmission from the base station 105, UEs 115 may transmit acknowledgment feedback (e.g., HARQ ACK/NACK feedback, HARQ-ACK feedback, ACK/NACK feedback, etc.) to indicate whether the multicast or unicast transmission was successfully received and decoded by the UE 115 (e.g., an ACK to indicate a successful reception and decoding, a NACK to indicate an unsuccessful reception and/or decoding). A UE 115 may identify a transmission power for the acknowledgement feedback according to various techniques, which may include determining a closed loop power control parameter, an open loop power control parameter, or both. According to various examples disclosed herein, power control parameters for a feedback transmission may be based on such a feedback transmission including acknowledgment feedback for a transmission that is multicast to a plurality of UEs 115.

Figure 2:
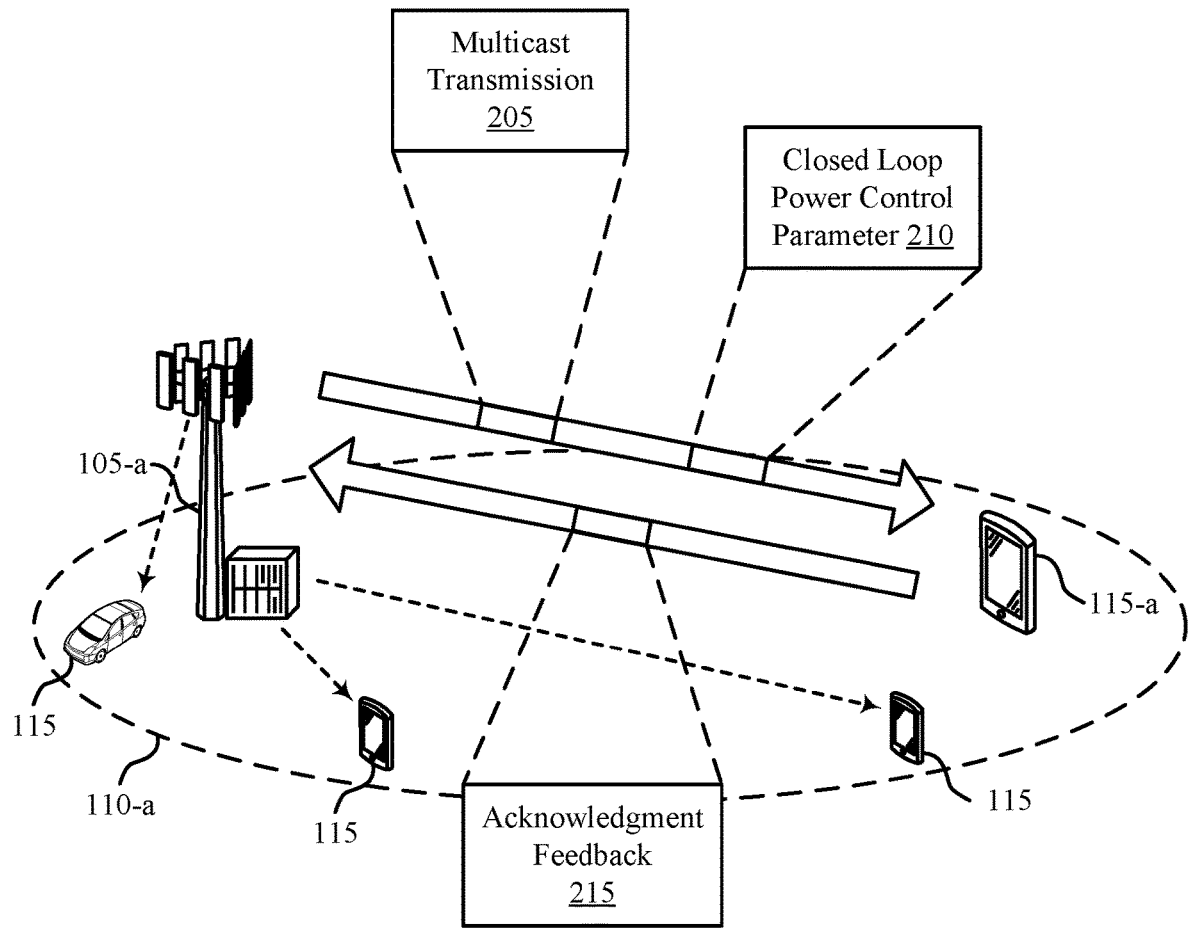
FIG. 2 illustrates an example of a wireless communications system that supports closed loop feedback power control for multicast transmissions in accordance with aspects of the present disclosure.

FIG. 2 illustrates an example of a wireless communications system 200 that supports closed loop feedback power control for multicast transmissions in accordance with aspects of the present disclosure. In some examples, wireless communications system 200 may implement aspects of wireless communications system 100. Wireless communications system 200 may include a base station 105-*a*, a UE 115-*a*, and multiple additional UEs 115, which may be examples of corresponding base stations 105 and UEs 115, respectively, as described with reference to FIG. 1.

In some examples of the wireless communications system 200, base station 105-*a* may communicate with multiple UEs 115 simultaneously. For example, base station 105-*a* and the UEs 115 may support a multicast service, where base station 105-*a* transmits a message to UE 115-*a* and the multiple additional UEs 115 (e.g., via a dedicated radio bearer, via a multicast downlink bearer, etc.) rather than broadcasting the message to every UE 115 in a geographic coverage area 110-*a* of base station 105-*a*. In some cases, such a multicast transmission may include a scheduling by way of a multicast downlink grant or multicast downlink assignment from base station 105-*a* that may be conveyed via a control message such as DCI of a physical downlink control channel (PDCCH) or other control signaling. Additionally or alternatively, base station 105-*a* may transmit the message to the UEs 115 individually through unicast transmissions. In some examples, a device of the wireless communications system 200 (e.g., base station 105-*a*) may be configured to support a dynamic selection of whether to transmit a particular data message (e.g., a MAC protocol data unit (PDU)) either as a multicast transmission or as a unicast transmission.

A UE 115 may use various types of acknowledgment feedback 215 for a multicast transmission 205. For example, the UE 115 may use a UE-dedicated ACK/NACK feedback configuration, where the UE 115 receiving a multicast transmission 205 (e.g., a multicast data transmission) sends an ACK or a NACK using a resource (e.g., a feedback resource, a resource in the time domain and frequency domain, a time-frequency resource, etc.) configured or indicated by base station 105-*a* (e.g., or another network device). In some examples, a configured or indicated resource for transmitting the acknowledgment feedback 215 may be dedicated solely for a particular UE 115 (e.g., UE 115-*a*) and may be transparent to other UEs 115 receiving the multicast transmission 205 that transmit the acknowledgment feedback 215 (e.g., UE-transparent).

Additionally or alternatively, a UE 115 may use a UE-shared NACK feedback configuration, where the UE 115 receiving a multicast transmission 205 sends a NACK using a resource configured or indicated by base station 105-*a* if a reception or decoding error is identified. However, in some examples of the UE-shared NACK configuration, the UE 115 may not send the acknowledgment feedback 215 otherwise (e.g., may refrain from transmitting an ACK if the multicast transmission 205 is successfully received and decoded). In the UE-shared NACK feedback configuration, a feedback resource may be shared by multiple UEs 115 receiving the multicast transmission 205, which may also be transparent to other UEs 115. In such examples where a feedback resource is shared among UEs 115, base station 105-*a* may not know which UE 115 transmitted a NACK and, as such, may retransmit data carried initially in the multicast transmission 205 (e.g., via a multicast retransmission, via one or more unicast transmissions, etc.) to all of the UEs 115 scheduled for the original multicast transmission 205. In some cases, base station 105-*a* may assign or divide UEs 115 receiving the multicast transmission 205 into smaller groups of UEs 115 (e.g., subsets of UEs 115), such that if a NACK is received, base station 105-*a* may identify one of the smaller groups from which the NACK is received and retransmit the message to a smaller group of UEs 115 rather than all of the UEs 115 scheduled for the multicast transmission 205.

Conventionally, when a UE 115 is configured to transmit acknowledgment feedback for unicast data, a TPC command may be included in a scheduling DCI that schedules the UE 115 to receive the unicast data and/or transmit the acknowledgment feedback. In some cases, base station 105-*a* may control the value of the TPC command in the scheduling DCI so that the received power (e.g., or the received signal-to-interference-plus-noise ratio (SINR)) is kept within an appropriate range (e.g., decoding error or false-detection satisfies the requirement). Additionally, base station 105-*a* may use related techniques for indicating a TPC command for the UEs 115 to use when transmitting the acknowledgment feedback 215 for a multicast transmission 205. For example, base station 105-*a* may transmit a scheduling DCI for the multicast transmission 205, for the acknowledgment feedback 215 in response to the multicast transmission 205, or for both. Accordingly, the UEs 115 may use this TPC command for determining a transmit power when transmitting the acknowledgment feedback 215 for the multicast transmission 205. In some cases, this TPC command may be referred to as a closed loop power control parameter 210 for the UEs 115 to use when determining the transmit power of the acknowledgment feedback 215 (e.g., the network indicates the TPC command to the UEs 115).

However, for the multicast transmission 205, when using the scheduling DCI for indicating the TPC command (e.g., or additional closed loop power control parameters), issues may arise. For example, preferred TPC command values may differ across each of the multiple UEs 115 receiving the same multicast transmission 205. As such, controlling the transmit power for the acknowledgment feedback 215 by the TPC command in the commonly monitored DCI scheduling the multicast transmission 205 for all of the UEs 115 may not be desirable (e.g., one TPC command value may not be suitable for all of the UEs 115). Additionally or alternatively, in the case of the UE-shared NACK feedback configuration as described above, the received power for the NACK feedback may differ depending on how many UEs 115 have sent a NACK. For example, the number of UEs 115 sending a NACK may be unpredictable by base station 105-*a*, and, therefore, base station 105-*a* may have trouble setting an appropriate TPC command.

Wireless communications system 200 may support efficient techniques for UE 115-*a* to identify a closed loop power control parameter 210 for transmitting acknowledgment feedback 215 (e.g., HARQ ACK/NACK feedback, HARQ-ACK feedback, ACK/NACK feedback, etc.) in response to a multicast transmission 205. UE 115-*a* may identify closed loop power control parameter 210 based on receiving multicast transmission 205 transmitted by base station 105-*a* to UE 115-*a* and the multiple additional UEs 115 (e.g., if UE 115-*a* is configured to receive multicast transmission 205, UE 115-*a* determines to monitor for and receive closed loop power control parameter 210). Additionally, closed loop power control parameter 210 may be indicated to UE 115-a via separate methods than a scheduling DCI that schedules multicast transmission 205, acknowledgment feedback 215, or both (e.g., where the scheduling DCI carries a TPC command as described above). Accordingly, these separate methods may preclude the issues described above with indicating power control parameters in a DCI message that is commonly monitored by all UEs 115 receiving multicast transmission 205. Based on identifying closed loop power control parameter 210, UE 115-a may determine an appropriate transmit power for transmitting acknowledgment feedback 215 to base station 105-a (e.g., to result in a preferred receive power at base station 105-a) in response to multicast transmission 205.

In some examples, for UE 115-a receiving multicast transmission 205, base station 105-a may indicate closed loop power control parameter 210 to UE 115-a via a group-TPC DCI message (e.g., a DCI format 2_2). Additionally, UE 115-a (e.g., and any additional UEs 115 receiving multicast transmission 205 and transmitting acknowledgment feedback 215 for multicast transmission 205) may not monitor a TPC command transmitted in the scheduling DCI. For example, UE 115-a may ignore the field for the TPC command in the scheduling DCI, or the field for the TPC command may not exist in the scheduling DCI, or both. Alternatively, UE 115-a may be configured (e.g., by base station 105-a) to monitor for the group-TPC DCI message. Accordingly, if UE 115-a detects and receives the group-TPC DCI message, UE 115-a may then identify closed loop power control parameter 210 transmitted with the group-TPC DCI message.

For example, UE 115-a may also be configured to identify a number of consecutive bits in the group-TPC DCI message for determining the closed loop power control parameter 210. In some cases, the consecutive bits (e.g., and the rest of the group-TPC DCI message) may include a CRC scrambled by a certain radio network temporary identifier (RNTI). For example, the certain RNTI may be an RNTI configured for using a TPC for a physical uplink control channel (PUCCH) (e.g., a TPC-PUCCH-RNTI), a group RNTI (G-RNTI) configured for multicast transmission 205, or a combination thereof. In some cases, the G-RNTI configured for multicast transmission 205 may indicate to UEs 115 receiving multicast transmission 205 (e.g., including UE 115-a) that multicast transmissions 205 is transmitted to multiple UEs 115 (e.g., the G-RNTI indicates that multicast transmission 205 is a transmission multicasted to the multiple UEs 115). Additionally, the closed loop power control parameter 210 indicated by the consecutive bits may be a TPC command for acknowledgment feedback 215. For example, the TPC command indicated by the consecutive bits may enable UE 115-a to determine a transmit power for transmitting a physical uplink control channel (PUCCH) carrying acknowledgment feedback 215 (e.g., ACK/NACK or NACK feedback for UE-dedicated ACK/NACK feedback configurations or UE-shared NACK feedback configurations, respectively) in response to multicast transmission 205.

In some cases, the consecutive bits may be two (2) bits that start from a bit position further indicated by base station 105-a. For example, base station 105-a may configure and indicate the starting bit position for the consecutive bits via RRC signaling. The two (2) consecutive bits within the group-TPC DCI message may represent different TPC command field values for UE 115-a to use for determining a transmit power for transmitting acknowledgment feedback 215. In some examples, the TPC command field values indicated by the two (2) consecutive bits may range from zero (0) to three (3) (e.g., '00' corresponds to a TPC command field of 0, '01' corresponds to a TPC command field of 1, '10' corresponds to a TPC command field of 2, and '11' corresponds to a TPC command field of 3). Table 1 may represent corresponding accumulated values for UE 115-a to use when determining the transmit power when transmitting acknowledgment feedback 215.

TABLE 1

| TPC Command Fields from Two Bits in Group-TPC DCI Message | |
|---|---|
| TPC Command Field | Accumulated Values (dB) |
| 0 | −3 |
| 1 | 0 |
| 2 | 3 |
| 3 | 6 |

The accumulated values in Table 1 may correspond to larger or smaller values compared to existing accumulated values indicated by TPC command fields. For example, conventionally, TPC command field 0 may correspond to an accumulated value of −1 dB, TPC command field 1 may correspond to an accumulated value of 0 dB, TPC command field 2 may correspond to an accumulated value of 1 dB, and TPC command field 3 may correspond to an accumulated value of 3 dB.

Additionally or alternatively, the consecutive bits may be three (3) bits that start from the bit position indicated by base station 105-a (e.g., via RRC signaling). For example, the number of TPC command fields may increase based on using the three (3) bits and may range from zero (0) to seven (7) (e.g., '000' corresponds to a TPC command field of 0, '001' corresponds to a TPC command field of 1, '010' corresponds to a TPC command field of 2, '011' corresponds to a TPC command field of 3, '100' corresponds to a TPC command field of 4, '101' corresponds to a TPC command field of 5, '110' corresponds to a TPC command field of 6, and '111' corresponds to a TPC command field of 7). Accordingly, with the increased number of TPC command fields, the number of possible accumulated values may increase, as well as the values for the accumulated values may differ from conventional TPC commands. Tables 2 and 3 may represent different accumulated values for TPC command fields indicated by three (3) bits in the group-TPC DCI message.

TABLE 2

| TPC Command Fields from Three Bits in Group-TPC DCI Message | |
|---|---|
| TPC Command Field | Accumulated Values (dB) |
| 0 | −6 |
| 1 | −3 |
| 2 | −1 |
| 3 | 0 |
| 4 | 1 |
| 5 | 3 |
| 6 | 6 |
| 7 | 9 |

TABLE 3

TPC Command Fields from Three
Bits in Group-TPC DCI Message

| TPC Command Field | Accumulated Values (dB) |
|---|---|
| 0 | −1 |
| 1 | 0 |
| 2 | 1 |
| 3 | 3 |
| 4 | −6 |
| 5 | −3 |
| 6 | 6 |
| 7 | 9 |

The conventional accumulated values for a TPC command (e.g., −1 dB, 0 dB, 1 dB, and 3 dB) may be included with the three (3) bit signaled TPC command fields, but additional accumulated values may also be included to give base station 105-a more flexibility on how to indicate different transmit powers for UE 115-a to use when transmitting acknowledgment feedback 215. For example, as shown in Table 2, the conventional accumulated values may correspond to TPC command fields 2, 3, 4, and 5, respectively, with lower accumulative values corresponding to lower TPC command fields (e.g., TPC command fields 0 and 1) and higher accumulative values corresponding to higher TPC command fields (e.g., TPC command fields 6 and 7). Additionally or alternatively, the conventional accumulated values may correspond to the least significant bits (LSBs) for the TPC command fields as shown in Table 3 (e.g., TPC command fields 0, 1, 2, and 3, respectively). Subsequently, the higher and lower accumulative value options may correspond to the next occurring TPC command fields (e.g., TPC command fields 4, 5, 6, and 7).

In some cases, the TPC command (e.g., closed loop power control parameter 210) indicated in the group-TPC DCI message (e.g., the DCI format 2_2) may be applied to any subsequent PUCCH transmitted by UE 115-a after receiving and identifying the TPC command. Additionally, UE 115-a may use a common closed loop power control process (e.g., a closed loop power control parameter 210) for the PUCCHs. Accordingly, UE 115-a may apply the TPC command received in the group-TPC DCI message to PUCCHs carrying feedback for multicast transmission 205 (e.g., acknowledgment feedback 215) or feedback for a unicast transmission. Additionally, UE 115-a may apply the single, common closed loop power control process for a PUCCH carrying feedback either for multicast transmission 205 or for a unicast transmission.

Additionally or alternatively, UE 115-a may apply the TPC command indicated in the group-TPC message to any PUCCH transmitted by UE 115-a (e.g., for feedback in response to multicast transmission 205, a unicast transmission, etc.), but UE 115-a may use separate closed loop power control processes for the different PUCCHs. Accordingly, UE 115-a may apply the TPC command received in the group-TPC DCI message to PUCCHs carrying feedback for multicast transmission 205 (e.g., acknowledgment feedback 215) or feedback for a unicast transmission, and in addition, for a PUCCH carrying feedback for a unicast transmission, a TPC command indicated in the DCI scheduling the unicast transmission (e.g., where the unicast transmission is transmitted on a physical downlink shared channel (PDSCH)) may also be applied when determining a transmit power for transmitting the feedback for the unicast transmission. However, separate closed loop power control processes may be used for PUCCHs carrying feedback for multicast transmission 205 and for PUCCHs carrying feedback for the unicast transmission.

Additionally or alternatively, the TPC command indicated in the group-TPC DCI message may be applied to a PUCCH carrying acknowledgment feedback 215 for multicast transmission from UE 115-a, and separate closed loop power control processes may be used for PUCCHs carrying feedback for multicast transmission 205 and for PUCCHs carrying feedback for the unicast transmission. Accordingly, UE 115-a may not use the TPC command indicated in the group-TPC DCI message for a PUCCH carrying feedback for the unicast transmission. In some cases, a separate TPC command in the group-TPC DCI message may be configured for the PUCCH carrying feedback for the unicast transmission separately.

In some examples, in addition to or rather than transmitting the closed loop power control parameter 210 (e.g., TPC command, closed loop power control process, etc.) in the group-TPC DCI message, UE 115-a may use configurations indicated by base station 105-a for separate uplink transmissions to identify the closed loop power control parameter 210. For example, when UE 115-a receives multicast transmission 205 and is configured to transmit acknowledgment feedback 215 for multicast transmission 205, UE 115-a may use a closed loop power control process configured for SRS to determine a transmit power for acknowledgment feedback 215. Base station 105-a may configure UE 115-a to transmit SRSs (e.g., periodically, aperiodically, etc.), where the configuration includes TPC commands and other configuration parameters for UE 115-a to transmit the SRSs (e.g., resources to transmit the SRSs, modulation and coding scheme (MCS), timings, etc.).

The TPC command (e.g., closed loop power control parameter 210) for the SRSs may be transmitted to UE 115-a in an uplink grant (e.g., configuring the SRSs), in a separate DCI message (e.g., DCI format 2_3), or a combination thereof. In some cases, the TPC command may include a CRC scrambled by an RNTI configured for the TPC command intended for transmitting the SRSs (e.g., a TPC-SRS-RNTI), where the TPC command is also then used for a PUCCH carrying acknowledgment feedback 215 for multicast transmission. Additionally, UE 115-a may use a shared closed loop power control process for PUCCHs carrying acknowledgment feedback 215 for multicast transmission 205 and for PUCCHs carrying an SRS. For a PUCCH carrying feedback for a unicast transmission, a TPC command in the DCI scheduling the unicast transmission (e.g., a unicast PDSCH) may be applied to the feedback for the unicast transmission. In some cases, if a group-TPC DCI message is configured and transmitted to UE 115-a, UE 115-a may apply a TPC command indicated in the group-TPC DCI message to the feedback for the unicast transmission.

For both using the group-TPC DCI message and the SRS configuration to indicate closed loop power control parameter 210, if a PUCCH carries feedback for both a unicast transmission and for multicast transmission 205 (e.g., the feedbacks are multiplexed), a closed loop power control process for the PUCCH may be used either for the unicast transmission and/or multicast transmission 205. Additionally or alternatively, the closed loop power control process for the PUCCH may be used solely for the unicast transmission. In some cases, if a physical uplink shared channel (PUSCH) carries acknowledgment feedback 215 for multicast transmission 205, the closed loop power control process for the PUSCH may be used that for that PUSCH carrying acknowledgment feedback 215.

Figure 3:
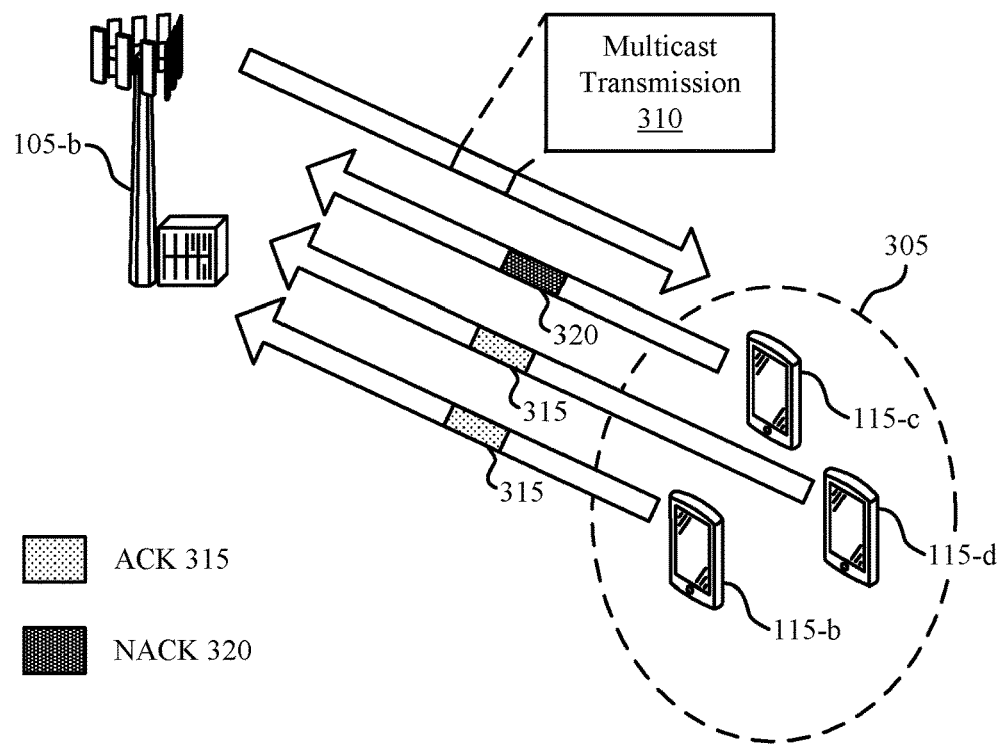
FIG. 3 illustrates an example of a unicast retransmission scheme that supports closed loop feedback power control for multicast transmissions in accordance with aspects of the present disclosure.
Figure 3:
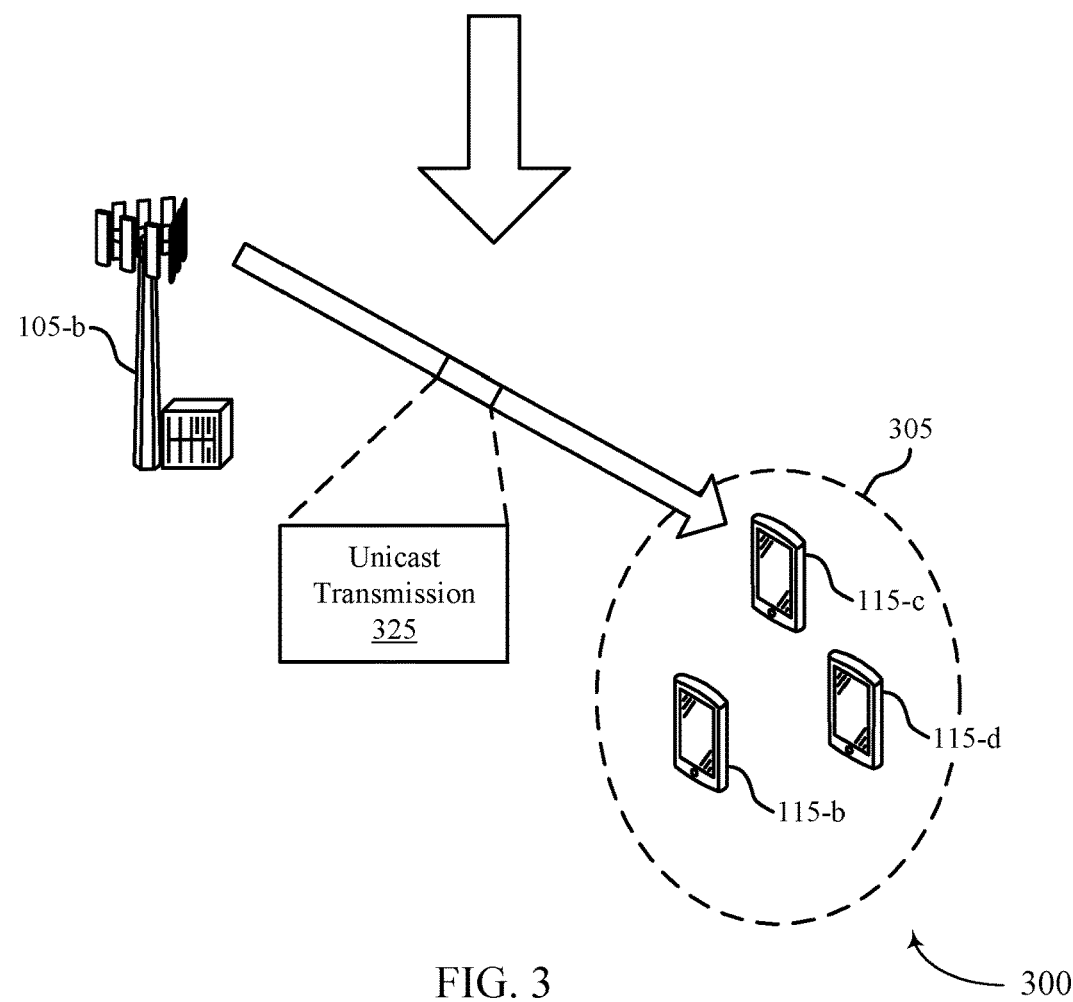

FIG. 3 illustrates an example of a unicast retransmission scheme 300 that supports closed loop feedback power control for multicast transmissions in accordance with aspects of the present disclosure. In some examples, unicast retransmission scheme 300 may implement aspects of wireless communications systems 100 and 200. Unicast retransmission scheme may include a base station 105-b and UEs 115-b, 115-c, and 115-d, which may be examples of corresponding base stations 105 and UEs 115, respectively, as described with reference to FIGS. 1 and 2. The UEs 115-b, 115-c, and 115-d may represent a group of UEs 305 that are configured to receive a multicast transmission 310 from base station 105-b.

Each of the UEs 115 in the group of UEs 305 may be configured to support reception of unicast transmissions, multicast transmissions, and various combinations thereof. In some cases, a UE 115 may receive both multicast and unicast transmissions on the same carrier (e.g., based on multiplexing the transmissions in a TDM, FDM, and/or spatial division multiplexing (SDM) manner). In some examples, unicast and multicast transmissions on the same carrier may be associated with different higher layer parameters or configurations, such as subcarrier spacing (SCS), cyclic prefix (CP), MIMO configurations, reference signals, transmission configuration indication (TCI) states, transport block size (TBS), MCS, uplink control information (UCI) feedback, etc. Unicast and multicast transmissions may be scheduled by common or separate schedulers, which may have same or different quasi-colocation properties. Accordingly, a multicast transmission may reach a UE 115 from at least one cell or the wireless communications system.

After receiving a multicast and/or unicast transmission from base station 105-b, the UEs 115 may transmit acknowledgment feedback (e.g., HARQ ACK/NACK feedback, HARQ-ACK feedback, ACK/NACK feedback, etc.) to indicate whether the multicast or unicast transmission was successfully received and decoded by the UE 115 (e.g., an ACK to indicate a successful reception and decoding or a NACK to indicate an unsuccessful reception and/or decoding). In some examples, feedback responsive to a multicast transmission may be reported by a UE 115 at least when the UE 115 is operating in an RRC_CONNECTED mode but may not be reported in an RRC_IDLE mode, such as when the RRC_IDLE mode is not associated with uncast data reception. When the network (e.g., base station 105-b) receives a NACK, the network may configure a retransmission of the original multicast transmission, which may be a multicast retransmission or one or more unicast retransmissions. Using such a feedback approach may support relaxing a block error rate (BLER) target or implementing a higher MCS for an initial transmission (e.g., an initial multicast transmission), which may improve spectral efficiency in the system.

As shown, base station 105-b may transmit a multicast transmission 310 to the group of UEs 305 (e.g., UEs 115-b, 115-c, and 115-d). Accordingly, each UE 115 in the group of UEs 305 may be configured to transmit acknowledgment feedback for the multicast transmission 310, where an ACK 315 is transmitted if the multicast transmission 310 is successfully received and decoded and a NACK 320 is transmitted if the multicast transmission 310 is unsuccessfully received and/or decoded. For example, UE 115-b may transmit an ACK 315, UE 115-c may transmit a NACK 320, and UE 115-d may transmit an ACK 315. Each of the UEs 115 may transmit the respective acknowledgment feedback messages on one or more feedback resources configured or indicated by base station 105-b that are dedicated to each UE 115 (e.g., UE-dedicated ACK/NACK feedback configuration), where the configured or indicated feedback resources are transparent to the group of UEs 305. Additionally or alternatively, in some cases (e.g., for a UE-shared NACK feedback configuration), one or more of the UEs 115 in the group of UEs 305 may transmit a NACK 320 if a decoding error is received on one or more shared feedback resources configured to carry the NACK 320 and may refrain from transmitting an ACK 315. For example, UE 115-c may report the NACK 320 on the shared feedback resource(s), while UEs 115-b and 115-d refrain from transmitting an acknowledgment feedback message based on successfully decoding and receiving the multicast transmission 310.

As described herein, when transmitting the acknowledgment feedback (e.g., ACK 315, NACK 320, etc.), the UEs 115 may determine a transmit power for the acknowledgment feedback based on one or more closed loop power control parameters indicated by base station 105-b. For example, base station 105-b may indicate the closed loop power control parameters (e.g., TPC command, closed loop power control processes, power increase, etc.) based on a group-TPC DCI message, an SRS configuration, RRC signaling, or a combination thereof.

Accordingly, based on receiving at least one NACK 320 (e.g., on the dedicated feedback resource(s) or on the shared feedback resource(s)), base station 105-b may retransmit the multicast transmission 310. For example, as shown, based on receiving the NACK 320 on dedicated feedback resource(s) configured for UE 115-c, base station 105-b may identify that UE 115-c alone did not receive and/or decode the multicast transmission 310. Subsequently, base station 105-b may retransmit the message initially carried in the multicast transmission 310 via a unicast transmission 325 sent directly to UE 115-c. Additionally or alternatively, if the shared feedback resource(s) are used to carry the NACK 320, base station 105-b may not know which UE 115 in the group of UEs 305 transmitted the NACK 320 and, as such, may retransmit the message initially carried in the multicast transmission 310 via an additional multicast transmission sent to the group of UEs 305.

Figure 4A:
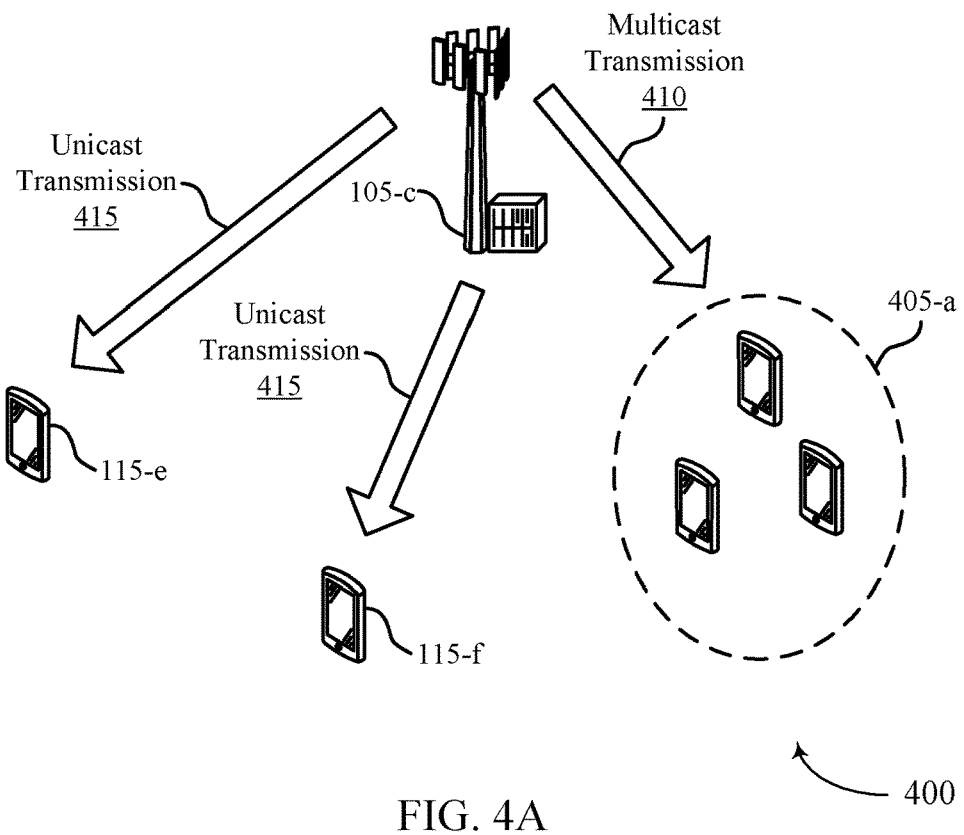
FIGS. 4A and 4B illustrate examples of dynamic unicast/multicast configurations that support closed loop feedback power control for multicast transmissions in accordance with aspects of the present disclosure.
Figure 4B:
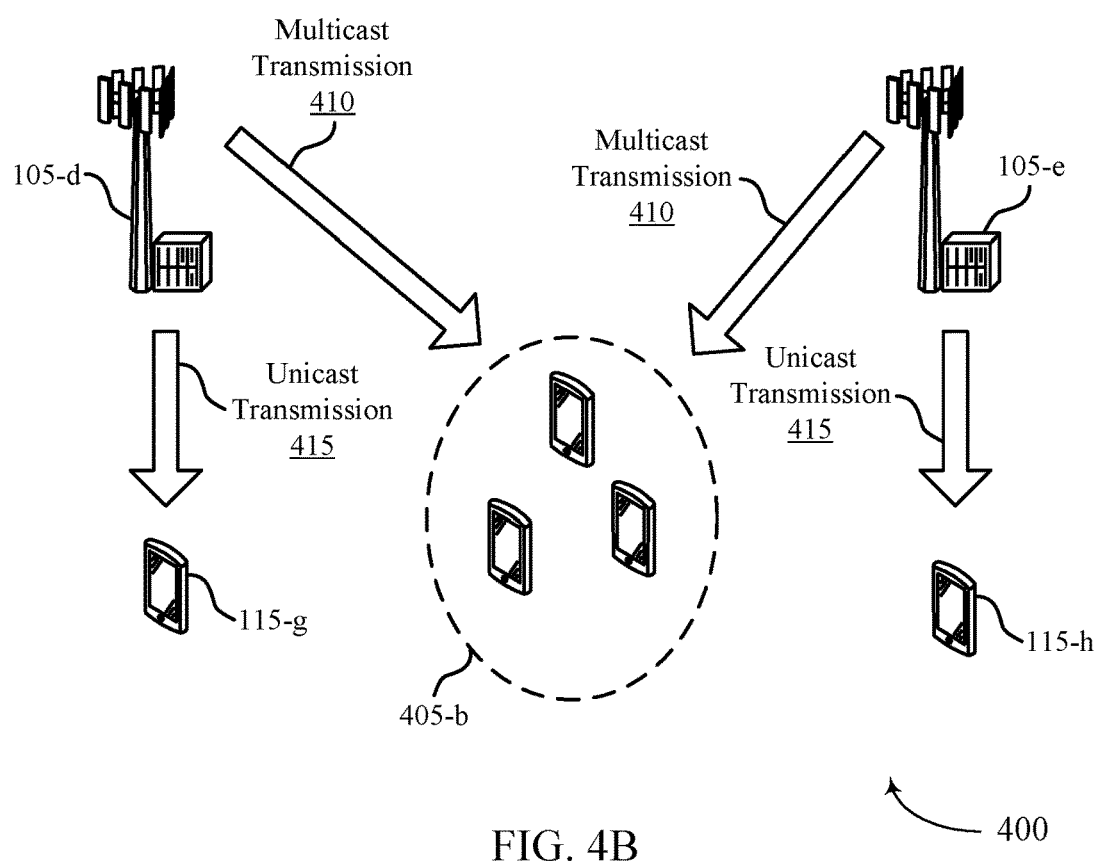

FIGS. 4A and 4B illustrate examples of dynamic unicast/multicast configurations 400 and 401, respectively, that support closed loop feedback power control for multicast transmissions in accordance with aspects of the present disclosure. In some examples, dynamic unicast/multicast configurations 400 and 401 may implement aspects of wireless communications systems 100 and 200. Dynamic unicast/multicast configurations 400 and 401 may include one or more base stations 105 and multiple UEs 115, which may be examples of corresponding base stations 105 and UEs 115, respectively, as described with reference to FIGS. 1-3. For example, dynamic unicast/multicast configuration 400 may include a base station 105-c, a UE 115-e, a UE 115-f, and a group of UEs 405-a, and dynamic unicast/multicast configuration 401 may include a base station 105-d, a base station 105-e, a UE 115-g, a UE 115-h, and a group of UEs 405-b.

Additionally, dynamic unicast/multicast configurations 400 and 401 may include a combination of multicast transmissions 410 and unicast transmissions 415. For example, in dynamic unicast/multicast configuration 400, base station 105-c may transmit a multicast transmission 410 to the group of UEs 405-a, a unicast transmission 415 to UE 115-e, and a unicast transmission 415 to UE 115-f. In dynamic unicast/multicast configuration 401, base station 105-d and base station 105-e may both transmit a multicast transmission 410 to the group of UEs 405-b, base station 105-d may transmit a unicast transmission 415 to UE 115-g, and base station 105-e may transmit a unicast transmission 415 to UE 115-h.

The multicast transmissions 410 and the unicast transmissions 415 may be scheduled by common or separate schedulers with same or different quasi-colocation (QCL) properties. Additionally, the data carried on the multicast transmissions 410 and the unicast transmissions 415 may be multiplexed in a TDM, an FDM, and/or an SDM manner. In some examples, the base stations 105 may be configured to support a dynamic selection of whether to transmit a particular data message (e.g., a MAC PDU) either as a multicast transmission or as a unicast transmission. As shown with dynamic unicast/multicast configurations 400 and 401, each of the base stations 105 may support a combination of transmitting data via both multicast transmissions 410 and unicast transmissions 415 simultaneously.

Figure 5:
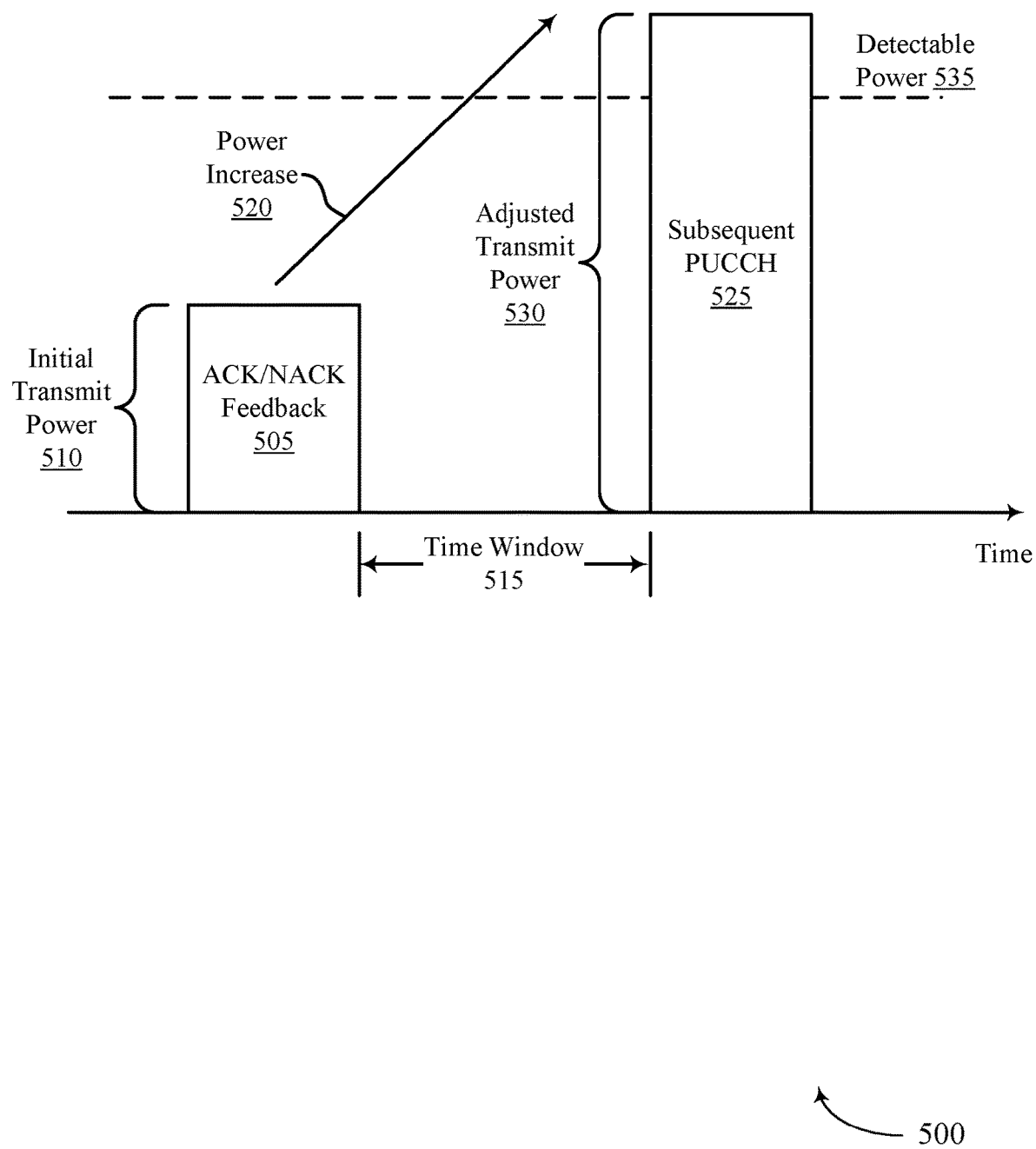
FIG. 5 illustrates an example of a transmission power adjustment that supports closed loop feedback power control for multicast transmissions in accordance with aspects of the present disclosure.

FIG. 5 illustrates an example of a transmission power adjustment 500 that supports closed loop feedback power control for multicast transmissions in accordance with aspects of the present disclosure. In some examples, transmission power adjustment 500 may implement aspects of wireless communications systems 100 and 200.

As described herein, a UE 115 may use transmission power adjustment 500 to adjust an initial transmit power 510 that was used for transmitting an acknowledgment feedback 505 (e.g., HARQ ACK/NACK feedback, HARQ-ACK feedback, ACK/NACK feedback, etc.) in response to a multicast transmission based on whether or not a DCI scheduling a retransmission is received within a time window 515 from a base station 105. Subsequently, UE 115-a may use an adjusted transmit power 530 for transmitting a subsequent PUCCH 525 if the DCI scheduling the retransmission was received or not within time window 515. The duration of time window and the amount of power that the initial transmit power is increased (e.g., a power increase 520) may be configured by the base station 105 (e.g., or another network device) and indicated to the UE 115 (e.g., via RRC signaling). In some cases, the power increase 520 may result in adjusted transmit power 530, such that the transmit power used for transmitting the subsequent PUCCH 525 exceeds a detectable power 535 for the base station 105 to increase chances that the subsequent PUCCH 525 is received and decoded successfully by the base station 105.

In some examples, if the UE 115 transmits a NACK for acknowledgment feedback 505 in response to the multicast transmission but does not receive the DCI scheduling the retransmission for a same HARQ process within time window 515, the UE 115 may increase the initial transmit power 510 by the value of power increase 520 to use the adjusted transmit power 530 for transmitting any subsequent PUCCH 525. For example, the subsequent PUCCH 525 may carry the same data that was initially transmitted in acknowledgment feedback 505 or may carry a separate acknowledgment feedback, different uplink data, or a combination thereof. In some cases, this increase in the transmit power may be treated similar to a TPC command accumulation. Additionally, in cases where the UE 115 resets the power control parameters (e.g., an initial power (P0), alpha, etc.) or the UE 115 performs a random access procedure, the accumulation may also be reset (e.g., to zero (0)).

Additionally or alternatively, if the UE 115 transmits an ACK for acknowledgment feedback 505 in response to the multicast transmission but does receive the DCI scheduling the retransmission for a same HARQ process within time window 515, the UE 115 may also increase the initial transmit power 510 by the value of power increase 520 to use the adjusted transmit power 530 for transmitting any subsequent PUCCH 525. In some cases, the UE 115 may use this example where acknowledgment feedback 505 was not reachable to the base station 105.

Figure 6:
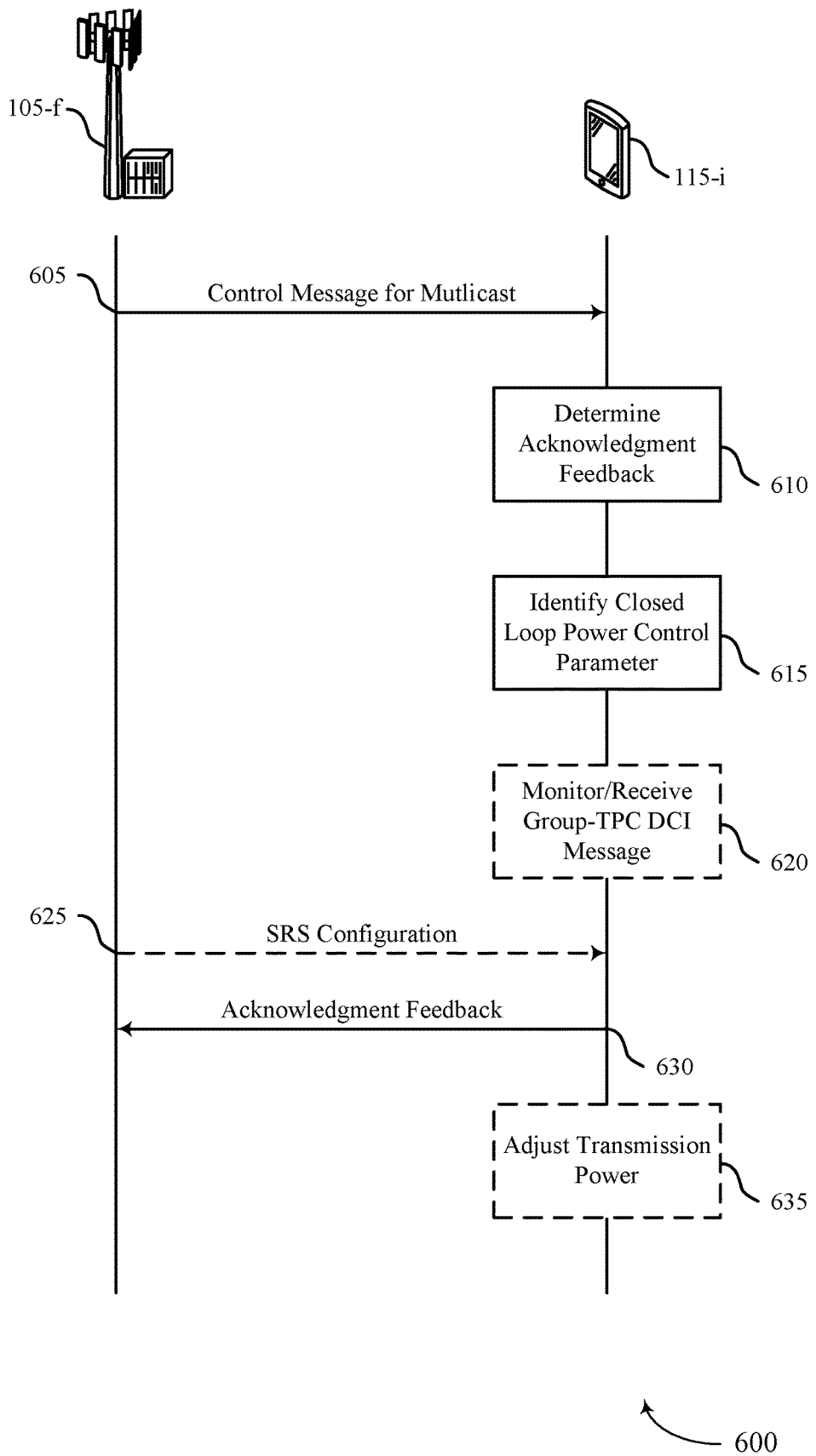
FIG. 6 illustrates an example of a process flow that supports closed loop feedback power control for multicast transmissions in accordance with aspects of the present disclosure.

FIG. 6 illustrates an example of a process flow 600 that supports closed loop feedback power control for multicast transmissions in accordance with aspects of the present disclosure. In some examples, process flow 600 may implement aspects of wireless communications systems 100 and 200. Process flow 600 may include a base station 105-f and a UE 115-i, which may be examples of corresponding base stations 105 and UEs 115, respectively, as described with reference to FIGS. 1-5.

In the following description of the process flow 600, the operations between UE 115-i and base station 105-f may be transmitted in a different order than the exemplary order shown, or the operations performed by UE 115-i and base station 105-f may be performed in different orders or at different times. Certain operations may also be left out of the process flow 600, or other operations may be added to the process flow 600. It is to be understood that while UE 115-i and base station 105-f are shown performing a number of the operations of process flow 600, any wireless device may perform the operations shown.

At 605, UE 115-i may receive a control message scheduling a multicast transmission to UE 115-i. For example, base station 105-f may identify a multicast transmission for a set of UEs 115 including UE 115-i and transmit the multicast transmission to the set of UEs 115. In some cases, UE 115-i may determine the multicast transmission is sent to the set of UEs 115 based on a group RNTI used for the multicast transmission.

At 610, UE 115-i may determine acknowledgement feedback (e.g., HARQ ACK/NACK feedback, HARQ-ACK feedback, ACK/NACK feedback, etc.) for the multicast transmission.

At 615, UE 115-i may identify, based on the multicast transmission being multicast to the set of UEs 115 (e.g., based on the group RNTI or an additional parameter indicating the multicast transmission is multicasted), a closed loop power control parameter for a feedback transmission to include the acknowledgment feedback. For example, UE 115-i may determine one or more closed loop power control processes to use for uplink control channels configured to carry the acknowledgment feedback for multicast transmissions, unicast transmissions, or both. In some cases, the closed loop power control parameter may be applied to uplink control channels configured to carry the acknowledgment feedback for multicast transmissions, unicast transmissions, or both. Additionally, base station 105-f may determine the closed loop parameter based on the multicast transmission for the set of UEs 115 and transmit an indication of the closed loop power control parameter to the set of UEs 115 (e.g., individually). In some cases, base station 105-f may transmit the indication of the closed loop power control parameter in a group-TPC DCI format that is separate from DCI scheduling the feedback transmissions.

At 620, UE 115-i may monitor a group-TPC DCI message for the closed loop power control parameter, where the group-TPC DCI message is different than a scheduling DCI for the acknowledgment feedback. Accordingly, in some cases, UE 115-i may receive the group-TPC DCI message and may identify a set of consecutive bits representative of a TPC value in the group-TPC DCI message, where the closed loop power control parameter is the TPC value.

Additionally, UE 115-*i* may receive a starting position for the set of consecutive bits via RRC signaling. In some cases, the set of consecutive bits may include a configured number of bits, where the configured number of bits is two (2) bits or three (3) bits. Accordingly, UE 115-*i* may receive an indication of the configured number of bits via RRC signaling. In some cases, the set of consecutive bits in the group-TPC DCI message may be received based on a CRC scrambled by an RNTI, where the RNTI includes a TPC-PUCCH-RNTI, a G-RNTI, or a combination thereof. Additionally, the group-TPC DCI message may include a DCI format 2_2.

At 625, UE 115-*i* may receive a configuration for transmitting SRSs, the configuration including a closed loop power control process for transmitting the SRSs and may apply the closed loop power control process for transmitting the SRSs to the acknowledgement feedback in the feedback transmission. Additionally, UE 115-*i* may receive a TPC command in an uplink grant for the SRSs, a DCI format (e.g., DCI format 2_3), or a combination thereof and may identify the TPC command for transmitting the acknowledgement feedback in the feedback transmission. In some cases, the DCI format is received based on a CRC scrambled by a TPC-SRS-RNTI. Additionally, the closed loop power control process may be used for transmitting the acknowledgment feedback and the SRSs.

At 630, UE 115-*i* may transmit the acknowledgement feedback in the feedback transmission in accordance with the closed loop power control parameter. In some cases, UE 115-*i* may transmit the acknowledgment feedback for a unicast transmission to UE 115-*i* and may receive the closed loop power control parameter in a DCI scheduling the unicast transmission, a separate DCI format for group-TPC (e.g., DCI format 2_2), or a combination thereof. Accordingly, UE 115-*i* may apply the closed loop power control parameter to the acknowledgment feedback for the unicast transmission.

In some cases, an uplink control channel (e.g., PUCCH) may carry the acknowledgment feedback for both multicast transmissions and unicast transmissions, and a closed loop power control process for the uplink control channel may be applied to either the multicast transmissions or the unicast transmissions. Additionally or alternatively, an uplink shared channel (e.g., PUSCH) may carry the acknowledgment feedback for multicast transmissions, and a closed loop power control process for the uplink shared channel may be applied to the uplink shared channel.

At 635, UE 115-*i* may transmit a NACK for the acknowledgment feedback; may monitor for DCI within a time window, the DCI scheduling a retransmission for a same HARQ process associated with the acknowledgment feedback; and may increase a transmit power for a subsequent feedback transmission based on not receiving the DCI within the time window. Additionally or alternatively, UE 115-*i* may transmit an ACK (e.g., positive acknowledgment) for the acknowledgment feedback; may monitor for DCI within the time window, the DCI scheduling the retransmission for the same HARQ process associated with the acknowledgment feedback; and may increase the transmit power for the subsequent feedback transmission based on receiving the DCI within the time window. In some cases, UE 115-*i* may receive, via RRC signaling, an indication of the time window, an amount for the transmit power increase, or a combination thereof.

Figure 7:
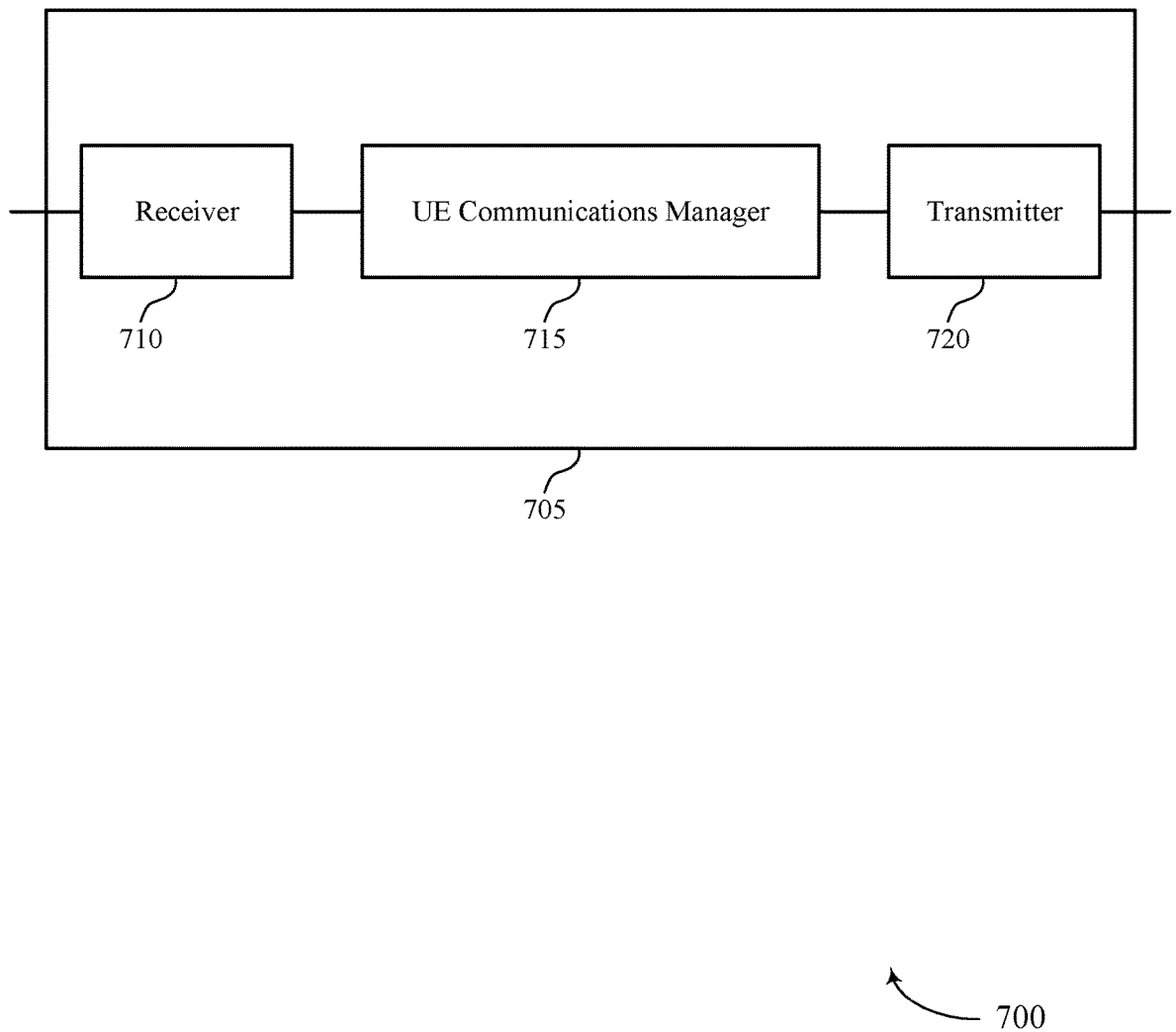
FIGS. 7 and 8 show block diagrams of devices that support closed loop feedback power control for multicast transmissions in accordance with aspects of the present disclosure.

FIG. 7 shows a block diagram 700 of a device 705 that supports closed loop feedback power control for multicast transmissions in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to closed loop feedback power control for multicast transmissions, etc.). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may receive, at a UE, a control message scheduling a multicast transmission to the UE. In some cases, the UE communications manager 715 may determine acknowledgment feedback for the multicast transmission at the UE. Additionally, the UE communications manager 715 may identify, based on the multicast transmission being multicast to a set of UEs, a closed loop power control parameter for a feedback transmission to include the acknowledgment feedback. Subsequently, the UE communications manager 715 may transmit the acknowledgment feedback in the feedback transmission in accordance with the closed loop power control parameter. The UE communications manager 715 may be an example of aspects of the UE communications manager 1010 described herein.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the UE communications manager 715 may be implemented as an integrated circuit or chipset for a mobile device modem, and the receiver 710 and transmitter 720 may be implemented as analog components (e.g., amplifiers, filters, antennas) coupled with the mobile device modem to enable wireless transmission and reception over one or more bands.

The UE communications manager 715 as described herein may be implemented to realize one or more potential advantages. One implementation may allow the device 705 to transmit acknowledgment feedback for a multicast transmission using a transmission power more specific to the device 705 (e.g., a closed loop power control parameter) rather than a common transmission power that each device receiving the multicast transmission can use. Accordingly, by using the transmission power specific to the device 705, the device 705 may increase reliability that the acknowledgment feedback is successfully received and decoded by a network device, thereby reducing a chance of retransmissions and expending power and processing resources for the retransmissions.

Figure 8:
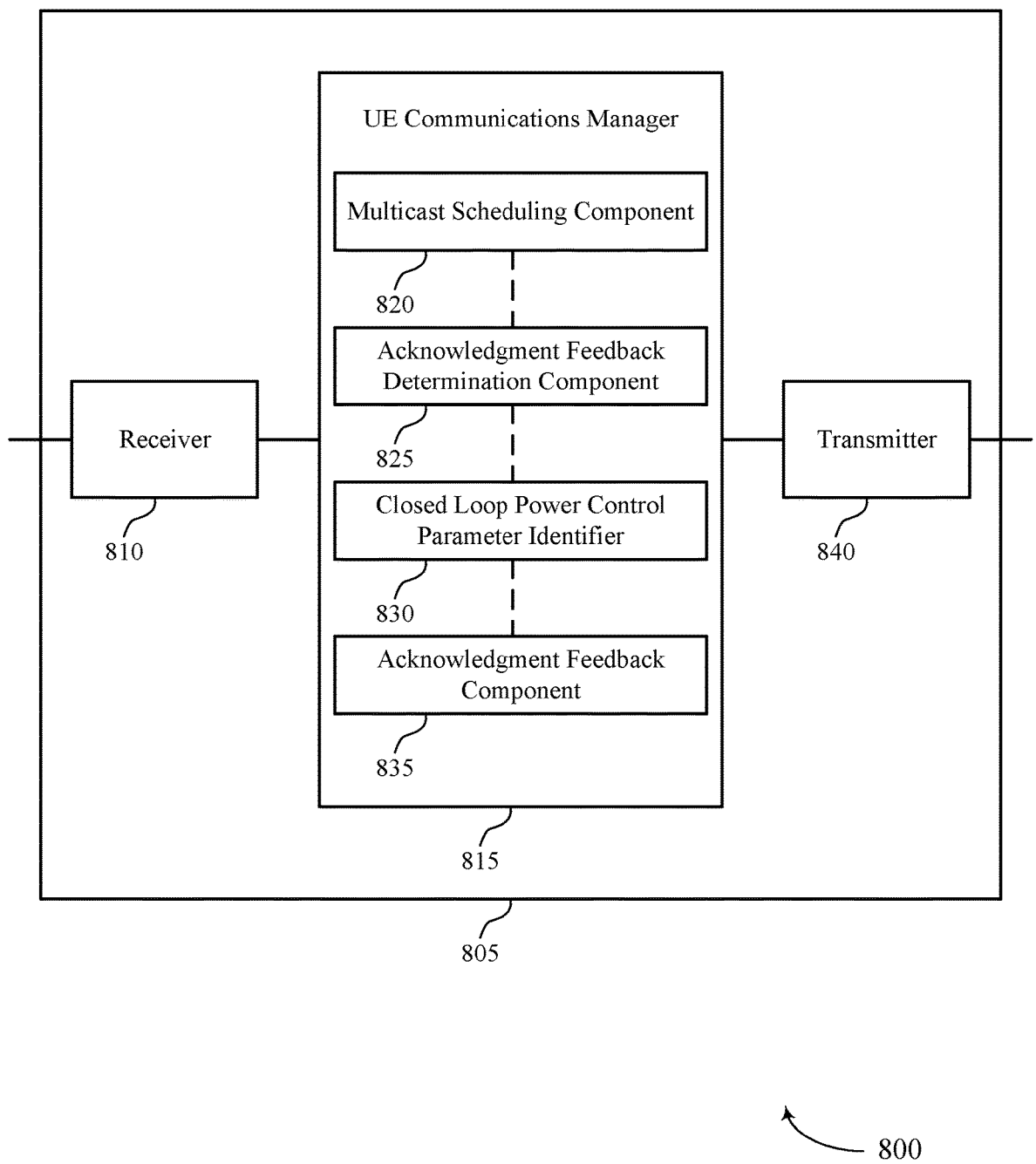

FIG. 8 shows a block diagram 800 of a device 805 that supports closed loop feedback power control for multicast transmissions in accordance with aspects of the present disclosure. The device 805 may be an example of aspects of a device 705, or a UE 115 as described herein. The device 805 may include a receiver 810, a UE communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to closed loop feedback power control for multicast transmissions, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include a multicast scheduling component 820, an acknowledgment feedback determination component 825, a closed loop power control parameter identifier 830, and an acknowledgment feedback component 835. The UE communications manager 815 may be an example of aspects of the UE communications manager 1010 described herein.

The multicast scheduling component 820 may receive, at a UE, a control message scheduling a multicast transmission to the UE.

The acknowledgment feedback determination component 825 may determine acknowledgment feedback for the multicast transmission at the UE.

The closed loop power control parameter identifier 830 may identify, based on the multicast transmission being multicast to a set of UEs, a closed loop power control parameter for a feedback transmission to include the acknowledgment feedback.

The acknowledgment feedback component 835 may transmit the acknowledgment feedback in the feedback transmission in accordance with the closed loop power control parameter.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Based on transmitting the acknowledgment feedback in the feedback transmission in accordance with the closed loop power control parameter, a processor of a UE 115 (e.g., controlling the receiver 810, the transmitter 840, or the transceiver 1020 as described with reference to FIG. 10) may increase reliability for transmitting the acknowledgment feedback by using the closed loop power control parameter to determine a transmission power specific to the UE 115 for the feedback transmission. Rather than using a common power control parameter, the closed loop power control parameter may enable the processor of the UE 115 to more efficiently prepare the acknowledgment feedback and increase a likelihood that the feedback transmission is successfully received by a network device.

Figure 9:
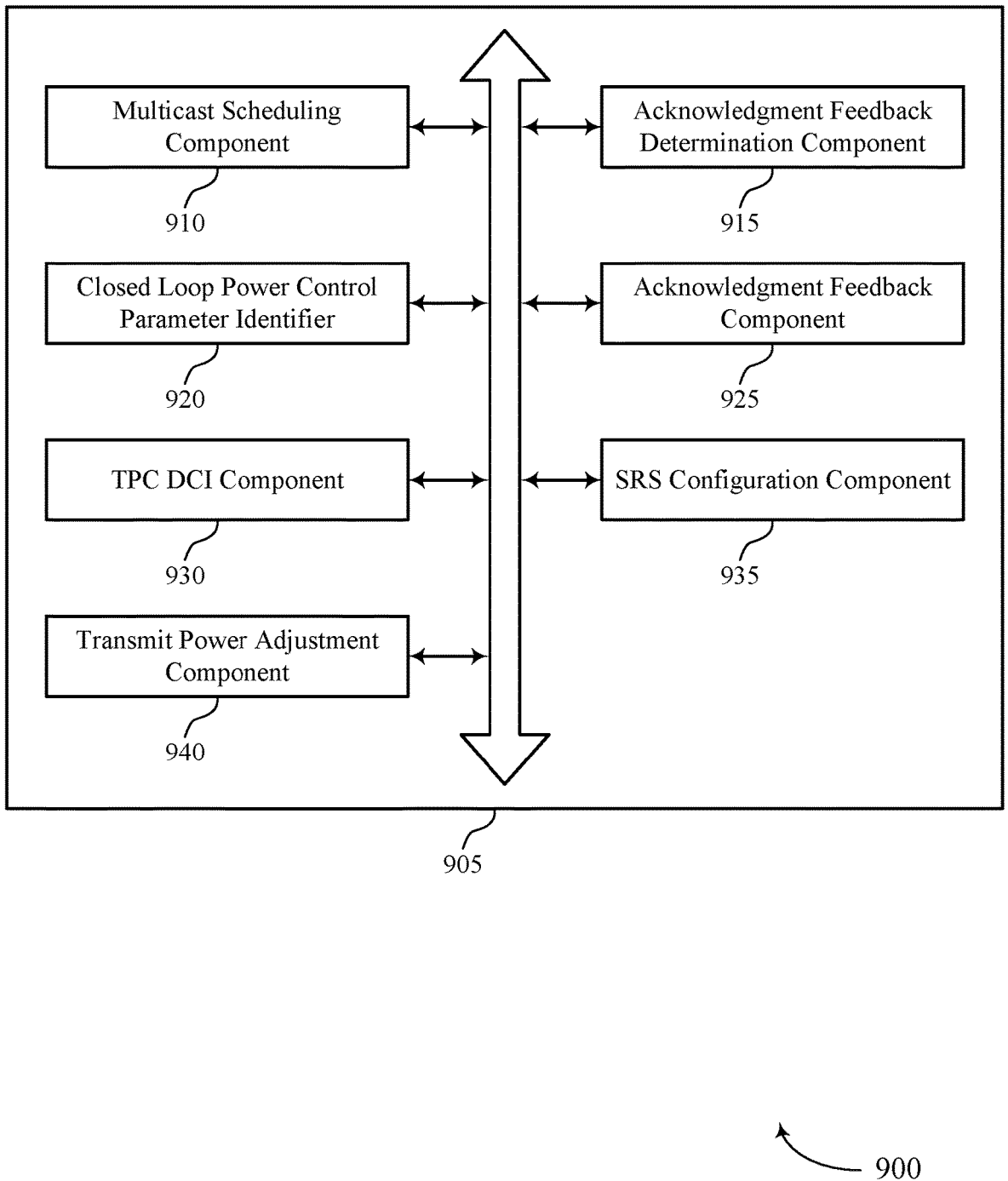
FIG. 9 shows a block diagram of a user equipment (UE) communications manager that supports closed loop feedback power control for multicast transmissions in accordance with aspects of the present disclosure.

FIG. 9 shows a block diagram 900 of a UE communications manager 905 that supports closed loop feedback power control for multicast transmissions in accordance with aspects of the present disclosure. The UE communications manager 905 may be an example of aspects of a UE communications manager 715, a UE communications manager 815, or a UE communications manager 1010 described herein. The UE communications manager 905 may include a multicast scheduling component 910, an acknowledgment feedback determination component 915, a closed loop power control parameter identifier 920, an acknowledgment feedback component 925, a TPC DCI component 930, a SRS configuration component 935, and a transmit power adjustment component 940. Each of these modules may communicate, directly or indirectly, with one another (e.g., via one or more buses).

The multicast scheduling component 910 may receive, at a UE, a control message scheduling a multicast transmission to the UE.

The acknowledgment feedback determination component 915 may determine acknowledgment feedback for the multicast transmission at the UE.

The closed loop power control parameter identifier 920 may identify, based on the multicast transmission being multicast to a set of UEs, a closed loop power control parameter for a feedback transmission to include the acknowledgment feedback. In some examples, the closed loop power control parameter identifier 920 may determine one or more closed loop power control processes to use for uplink control channels configured to carry the acknowledgment feedback for multicast transmissions, unicast transmissions, or both. Additionally, in some cases, the closed loop power control parameter may be applied to uplink control channels configured to carry the acknowledgment feedback for multicast transmissions, unicast transmissions, or both.

The acknowledgment feedback component 925 may transmit the acknowledgment feedback in the feedback transmission in accordance with the closed loop power control parameter. In some examples, the acknowledgment feedback component 925 may transmit the acknowledgment feedback for a unicast transmission to the UE and receive the closed loop power control parameter in a DCI scheduling the unicast transmission, a separate DCI format for group-TPC, or a combination thereof. Subsequently, the acknowledgment feedback component 925 may apply the closed loop power control parameter to the acknowledgment feedback for the unicast transmission. In some cases, an uplink control channel may carry the acknowledgment feedback for both multicast transmissions and unicast transmissions, and a closed loop power control process for the uplink control channel may be applied to either the multicast transmissions or the unicast transmissions. Additionally or alternatively, an uplink shared channel may carry the acknowledgment feedback for multicast transmissions, and a closed loop power control process for the uplink shared channel may be applied to the uplink shared channel.

The TPC DCI component 930 may monitor a group-TPC DCI message for the closed loop power control parameter, the group-TPC DCI message being different than a scheduling DCI for the acknowledgment feedback. Additionally, the TPC DCI component 930 may receive a group-TPC DCI message and identify a set of consecutive bits representative of a TPC value in the group-TPC DCI message, where the closed loop power control parameter is the TPC value. In some examples, the TPC DCI component 930 may receive a starting position for the set of consecutive bits via RRC signaling. Additionally, the set of consecutive bits may include a configured number of bits, where the configured number of bits is two bits or three bits. In some examples, the TPC DCI component 930 may receive an indication of the configured number of bits via RRC signaling. In some cases, the set of consecutive bits in the DCI may be received based on a CRC scrambled by an RNTI, the RNTI including a TPC-PUCCH-RNTI, a G-RNTI, or a combination thereof. In some cases, the group-TPC DCI message may be a DCI format 2_2.

The SRS configuration component 935 may receive a configuration for transmitting SRSs, the configuration including a closed loop power control process for transmitting the SRSs. In some examples, the SRS configuration component 935 may apply the closed loop power control process for transmitting the SRSs to the acknowledgment feedback in the feedback transmission. Additionally or alternatively, the SRS configuration component 935 may receive a TPC command in an uplink grant for the SRSs, a DCI format, or a combination thereof and may identify the TPC command for transmitting the acknowledgment feedback in the feedback transmission. In some cases, the DCI format may be received based on a CRC scrambled by a TPC-SRS-RNTI. Additionally, the closed loop power control process may be used for transmitting the acknowledgment feedback and the SRSs.

The transmit power adjustment component 940 may transmit a NACK for the acknowledgment feedback, monitor for DCI within a time window, the DCI scheduling a retransmission for a same HARQ process associated with the acknowledgment feedback, and increase a transmit power for a subsequent feedback transmission based on not receiving the DCI within the time window. Additionally or alternatively, the transmit power adjustment component 940 may transmit a positive ACK for the acknowledgment feedback, monitor for DCI within a time window, the DCI scheduling a retransmission for a same HARQ process associated with the acknowledgment feedback, and increase a transmit power for a subsequent feedback transmission based on receiving the DCI within the time window. In some examples, the transmit power adjustment component 940 may receive, via RRC signaling, an indication of the time window, an amount for the transmit power increase, or a combination thereof.

Figure 10:
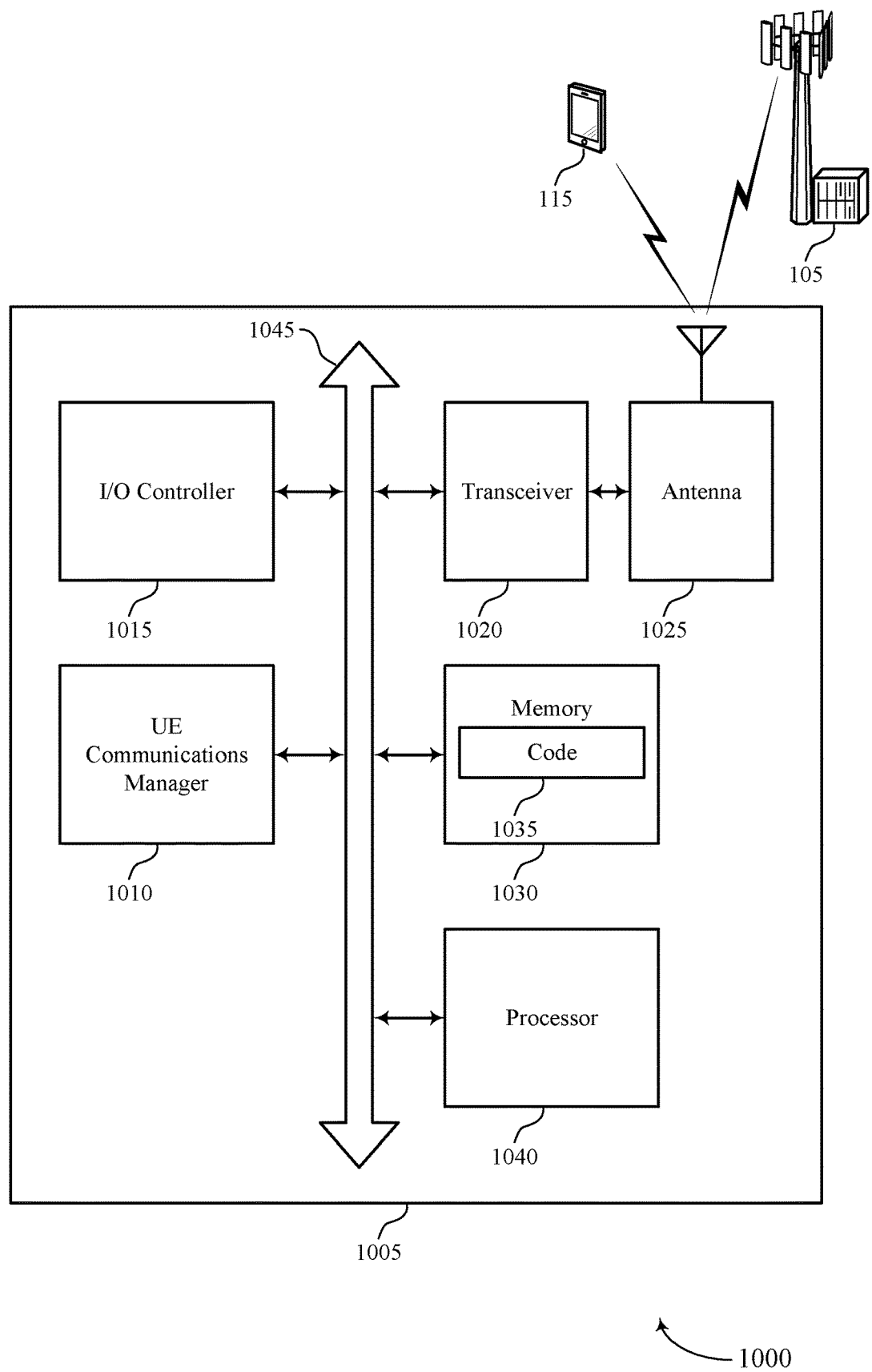
FIG. 10 shows a diagram of a system including a device that supports closed loop feedback power control for multicast transmissions in accordance with aspects of the present disclosure.

FIG. 10 shows a diagram of a system 1000 including a device 1005 that supports closed loop feedback power control for multicast transmissions in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be in electronic communication via one or more buses (e.g., bus 1045).

The UE communications manager 1010 may receive, at a UE, a control message scheduling a multicast transmission to the UE. In some cases, the UE communications manager 1010 may determine acknowledgment feedback for the multicast transmission at the UE. Additionally, the UE communications manager 1010 may identify, based on the multicast transmission being multicast to a set of UEs, a closed loop power control parameter for a feedback transmission to include the acknowledgment feedback. Subsequently, the UE communications manager 1010 may transmit the acknowledgment feedback in the feedback transmission in accordance with the closed loop power control parameter.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting closed loop feedback power control for multicast transmissions).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
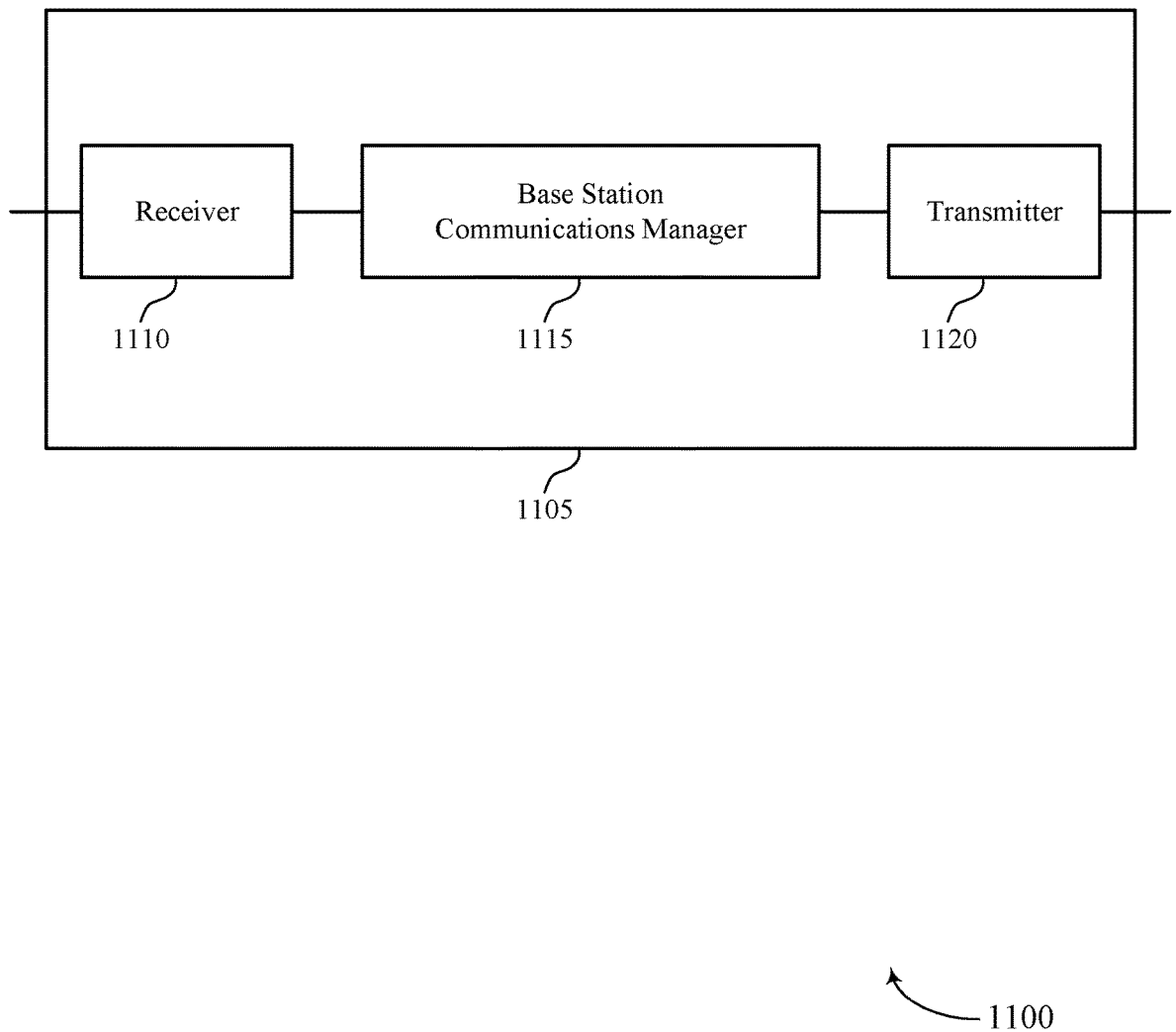
FIGS. 11 and 12 show block diagrams of devices that support closed loop feedback power control for multicast transmissions in accordance with aspects of the present disclosure.

FIG. 11 shows a block diagram 1100 of a device 1105 that supports closed loop feedback power control for multicast transmissions in accordance with aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to closed loop feedback power control for multicast transmissions, etc.). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may identify a multicast transmission for a set of UEs. In some cases, the base station communications manager 1115 may determine, based on the multicast transmission for the set of UEs, a closed loop power control parameter for feedback transmissions responsive to multicast transmissions. Subsequently, the base station communications manager 1115 may transmit, to the UEs, the multicast transmission and an indication of the closed loop power control parameter. The base station communications manager 1115 may be an example of aspects of the base station communications manager 1410 described herein.

The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
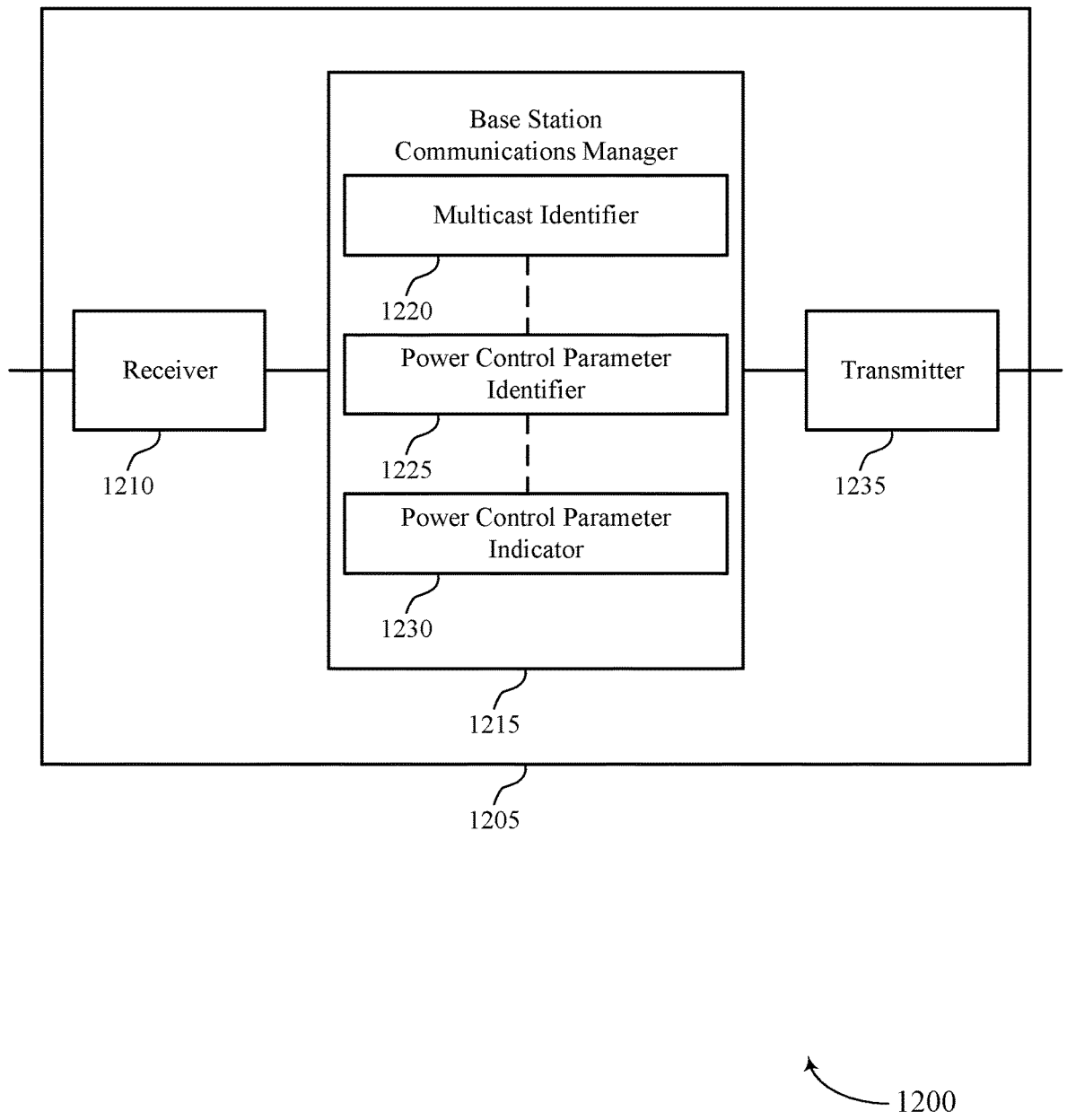

FIG. 12 shows a block diagram 1200 of a device 1205 that supports closed loop feedback power control for multicast transmissions in accordance with aspects of the present disclosure. The device 1205 may be an example of aspects of a device 1105, or a base station 105 as described herein. The device 1205 may include a receiver 1210, a base station communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to closed loop feedback power control for multicast transmissions, etc.). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include a multicast identifier 1220, a power control parameter identifier 1225, and a power control parameter indicator 1230. The base station communications manager 1215 may be an example of aspects of the base station communications manager 1410 described herein.

The multicast identifier 1220 may identify a multicast transmission for a set of UEs.

The power control parameter identifier 1225 may determine, based on the multicast transmission for the set of UEs, a closed loop power control parameter for feedback transmissions responsive to multicast transmissions.

The power control parameter indicator 1230 may transmit, to the UEs, the multicast transmission and an indication of the closed loop power control parameter.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
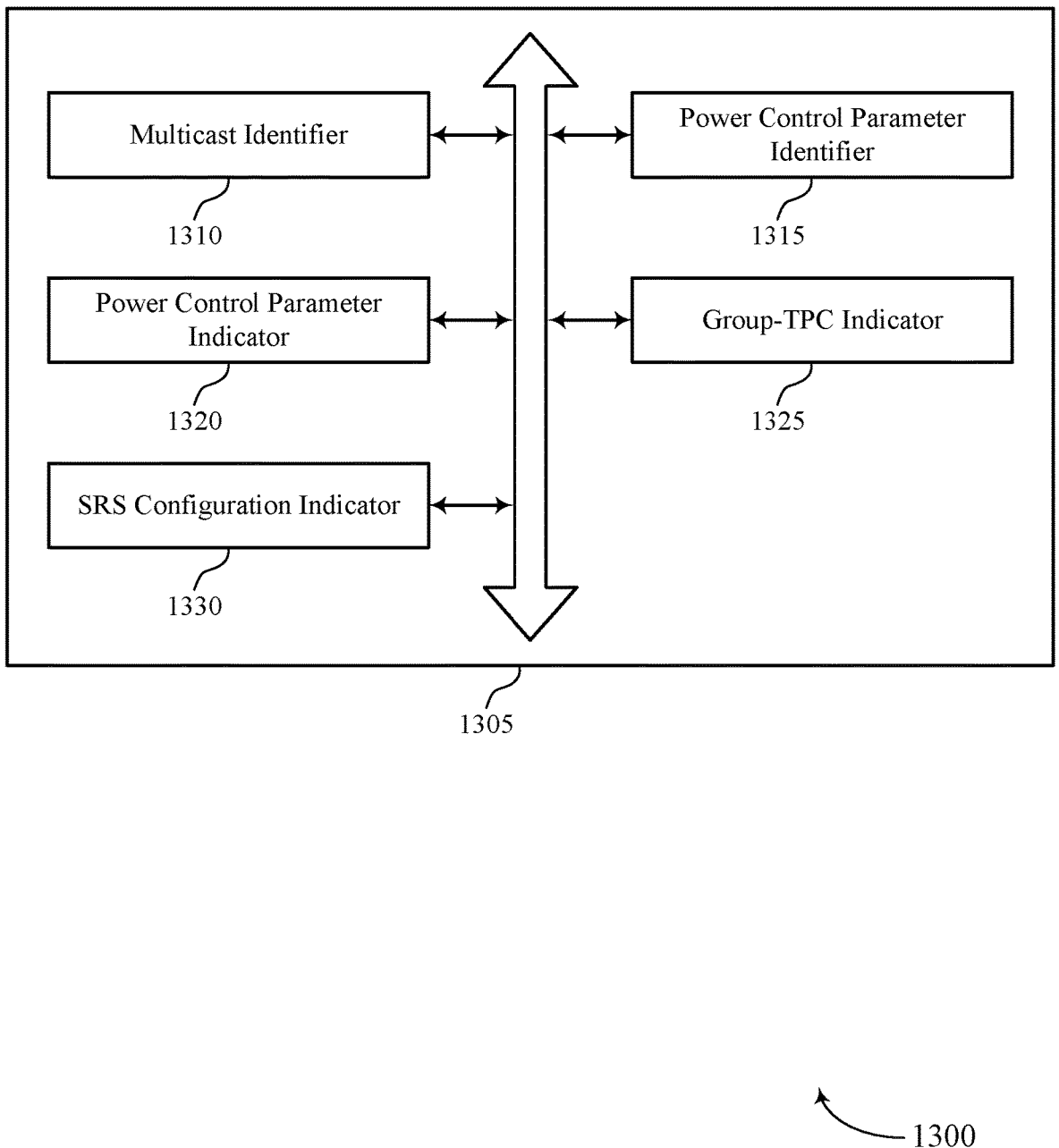
FIG. 13 shows a block diagram of a base station communications manager that supports closed loop feedback power control for multicast transmissions in accordance with aspects of the present disclosure.

FIG. 13 shows a block diagram 1300 of a base station communications manager 1305 that supports closed loop feedback power control for multicast transmissions in accordance with aspects of the present disclosure. The base station communications manager 1305 may be an example of aspects of a base station communications manager 1115, a base station communications manager 1215, or a base station communications manager 1410 described herein. The base station communications manager 1305 may include a multicast identifier 1310, a power control parameter identifier 1315, a power control parameter indicator 1320, a group-TPC indicator 1325, and a SRS configuration indicator 1330. Each of these modules may communicate, directly or indirectly, with one another (e.g., via one or more buses).

The multicast identifier 1310 may identify a multicast transmission for a set of UEs.

The power control parameter identifier 1315 may determine, based on the multicast transmission for the set of UEs, a closed loop power control parameter for feedback transmissions responsive to multicast transmissions.

The power control parameter indicator 1320 may transmit, to the UEs, the multicast transmission and an indication of the closed loop power control parameter. In some examples, the power control parameter indicator 1320 may transmit a TPC command in an uplink grant for SRSs, a DCI format, or a combination thereof, where the closed loop power control parameter is based on the TPC command.

The group-TPC indicator 1325 may transmit the indication of the closed loop power control parameter in a group-TPC DCI format that is separate from DCI scheduling the feedback transmissions. In some examples, the group-TPC indicator 1325 may transmit, via RRC signaling, an indication of a starting position for a set of consecutive bits in the group-TPC DCI format, where the set of consecutive bits conveys the closed loop power control parameter. In some cases, the set of consecutive bits may include a configured number of bits, where the configured number of bits is two bits or three bits. In some examples, the group-TPC indicator 1325 may transmit an indication of the configured number of bits via RRC signaling. In some examples, the set of consecutive bits in the DCI may be transmitted based on a CRC scrambled by an RNTI, the RNTI including a TPC-PUCCH-RNTI, a G-RNTI, or a combination thereof. Additionally, the group-TPC DCI format may be a DCI format 2_2.

The SRS configuration indicator 1330 may transmit a configuration for the set of UEs to transmit SRSs including a closed loop power control process for transmitting the SRSs, where the closed loop power control parameter is based on the closed loop power control process for transmitting the SRSs.

Figure 14:
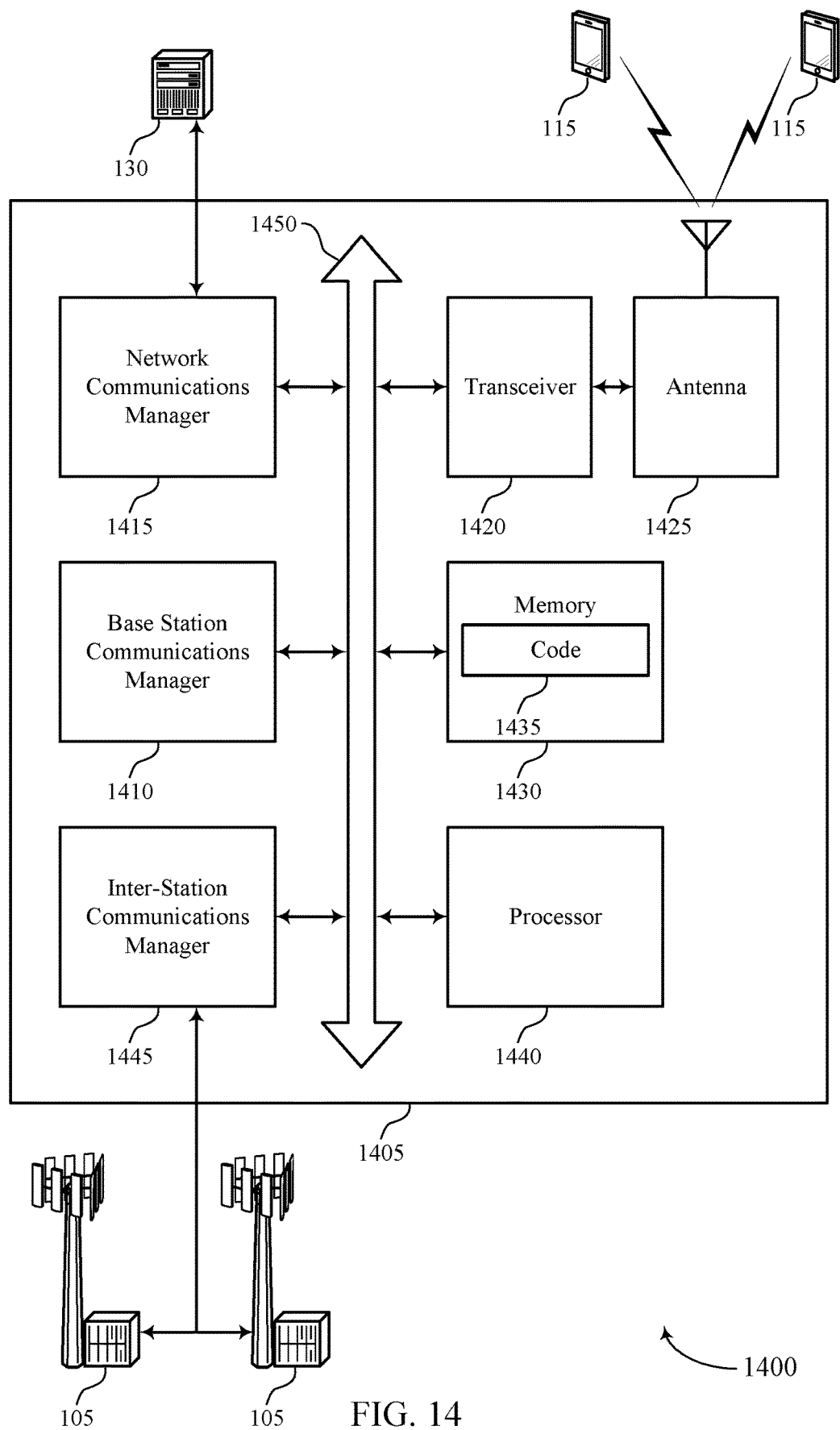
FIG. 14 shows a diagram of a system including a device that supports closed loop feedback power control for multicast transmissions in accordance with aspects of the present disclosure.

FIG. 14 shows a diagram of a system 1400 including a device 1405 that supports closed loop feedback power control for multicast transmissions in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station communications manager 1410 may identify a multicast transmission for a set of UEs. In some cases, the base station communications manager 1410 may determine, based on the multicast transmission for the set of UEs, a closed loop power control parameter for feedback transmissions responsive to multicast transmissions. Subsequently, the base station communications manager 1410 may transmit, to the UEs, the multicast transmission and an indication of the closed loop power control parameter.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting closed loop feedback power control for multicast transmissions).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
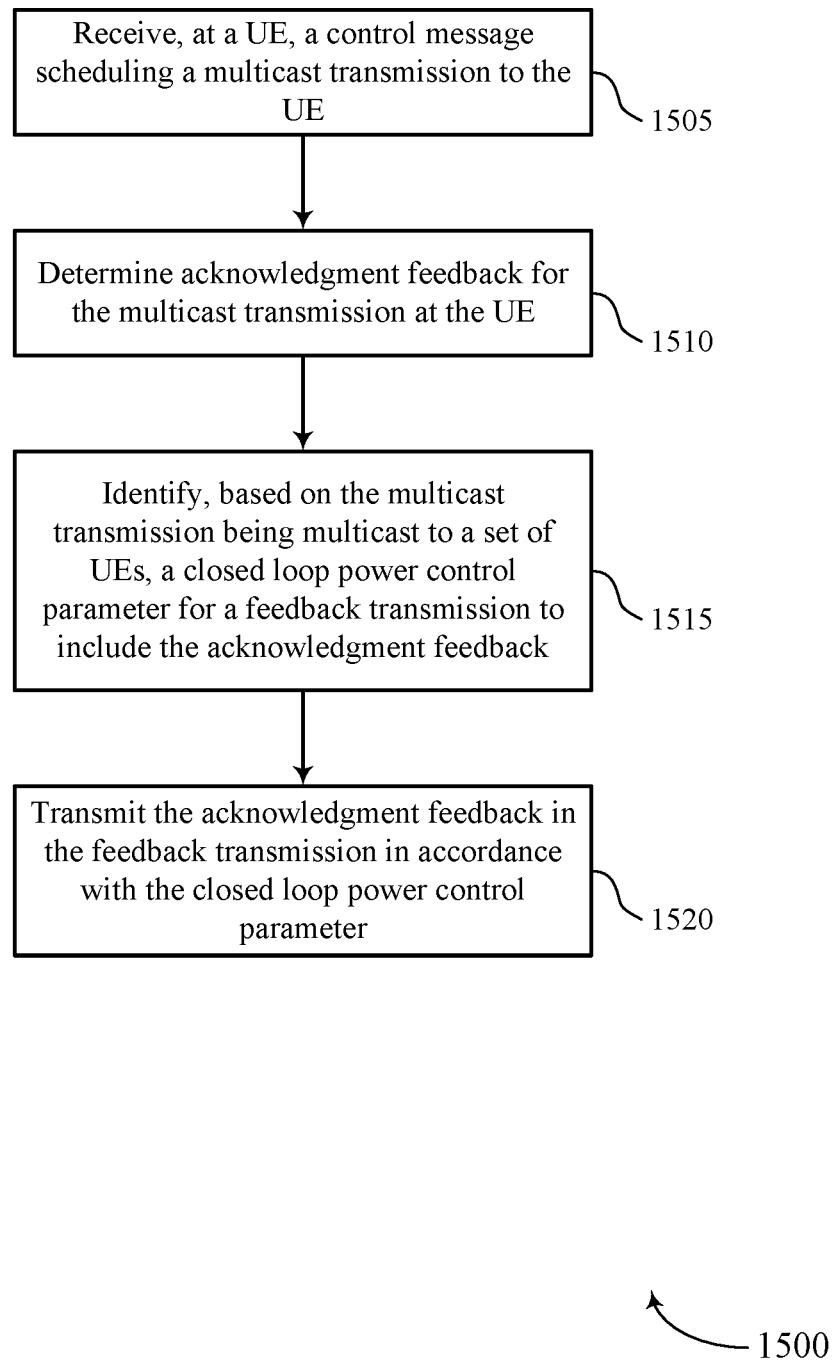
FIGS. 15 through 21 show flowcharts illustrating methods that support closed loop feedback power control for multicast transmissions in accordance with aspects of the present disclosure.

FIG. 15 shows a flowchart illustrating a method 1500 that supports closed loop feedback power control for multicast transmissions in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, at a UE, a control message scheduling a multicast transmission to the UE. The operations of 1505 may be performed according to the methods described herein. In some examples, aspects of the operations of 1505 may be performed by a multicast scheduling component as described with reference to FIGS. 7 through 10.

At 1510, the UE may determine acknowledgment feedback for the multicast transmission at the UE. The operations of 1510 may be performed according to the methods described herein. In some examples, aspects of the operations of 1510 may be performed by an acknowledgment feedback determination component as described with reference to FIGS. 7 through 10.

At 1515, the UE may identify, based on the multicast transmission being multicast to a set of UEs, a closed loop power control parameter for a feedback transmission to include the acknowledgment feedback. The operations of 1515 may be performed according to the methods described herein. In some examples, aspects of the operations of 1515 may be performed by a closed loop power control parameter identifier as described with reference to FIGS. 7 through 10.

At 1520, the UE may transmit the acknowledgment feedback in the feedback transmission in accordance with the closed loop power control parameter. The operations of 1520 may be performed according to the methods described herein. In some examples, aspects of the operations of 1520 may be performed by an acknowledgment feedback component as described with reference to FIGS. 7 through 10.

Figure 16:
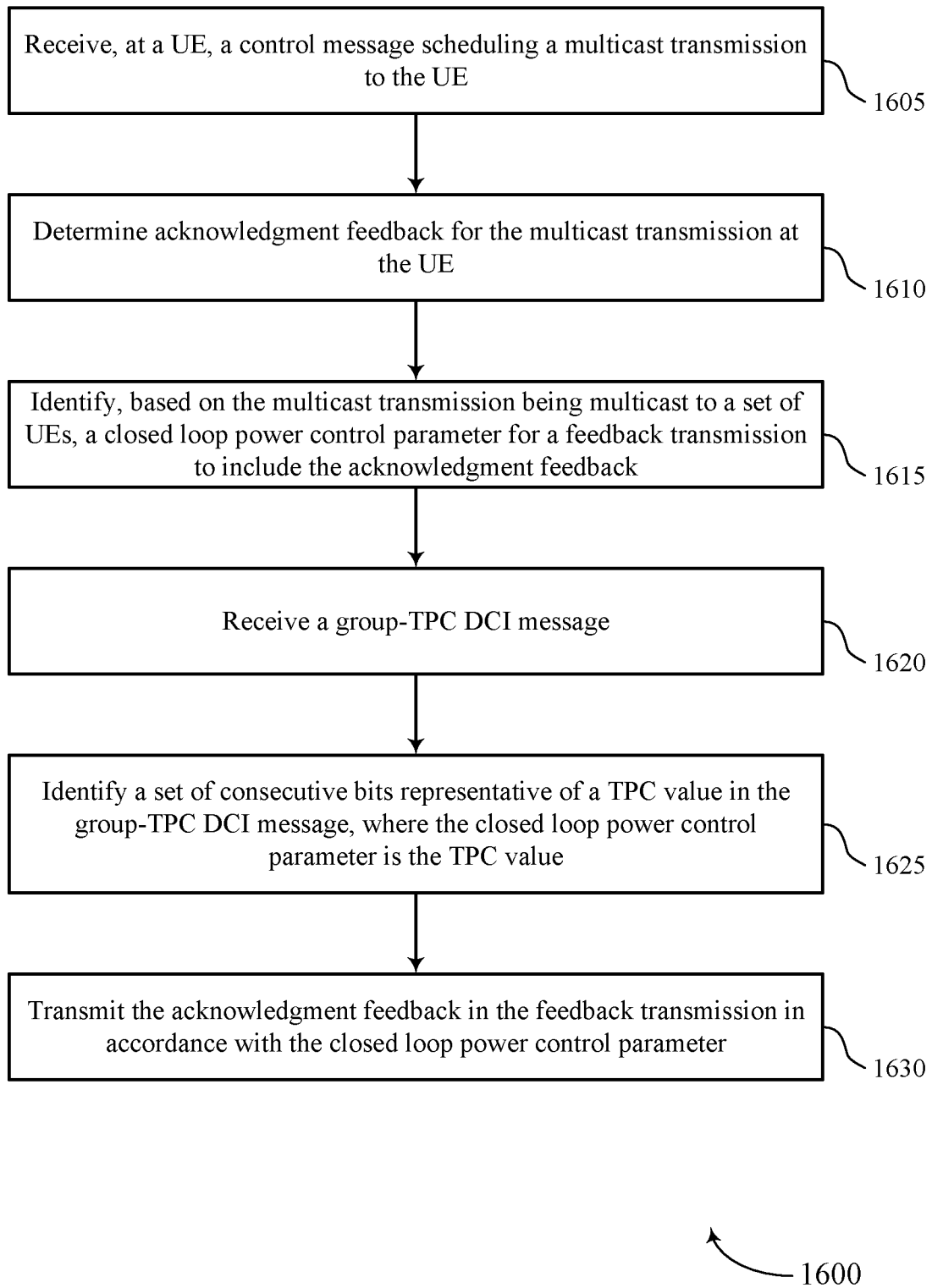

FIG. 16 shows a flowchart illustrating a method 1600 that supports closed loop feedback power control for multicast transmissions in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, at a UE, a control message scheduling a multicast transmission to the UE. The operations of 1605 may be performed according to the methods described herein. In some examples, aspects of the operations of 1605 may be performed by a multicast scheduling component as described with reference to FIGS. 7 through 10.

At 1610, the UE may determine acknowledgment feedback for the multicast transmission at the UE. The operations of 1610 may be performed according to the methods described herein. In some examples, aspects of the operations of 1610 may be performed by an acknowledgment feedback determination component as described with reference to FIGS. 7 through 10.

At 1615, the UE may identify, based on the multicast transmission being multicast to a set of UEs, a closed loop power control parameter for a feedback transmission to include the acknowledgment feedback. The operations of 1615 may be performed according to the methods described herein. In some examples, aspects of the operations of 1615 may be performed by a closed loop power control parameter identifier as described with reference to FIGS. 7 through 10.

At 1620, the UE may receive a group-TPC DCI message. The operations of 1620 may be performed according to the methods described herein. In some examples, aspects of the operations of 1620 may be performed by a TPC DCI component as described with reference to FIGS. 7 through 10.

At 1625, the UE may identify a set of consecutive bits representative of a TPC value in the group-TPC DCI message, where the closed loop power control parameter is the TPC value. The operations of 1625 may be performed according to the methods described herein. In some examples, aspects of the operations of 1625 may be performed by a TPC DCI component as described with reference to FIGS. 7 through 10.

At 1630, the UE may transmit the acknowledgment feedback in the feedback transmission in accordance with the closed loop power control parameter. The operations of 1630 may be performed according to the methods described herein. In some examples, aspects of the operations of 1630 may be performed by an acknowledgment feedback component as described with reference to FIGS. 7 through 10.

Figure 17:
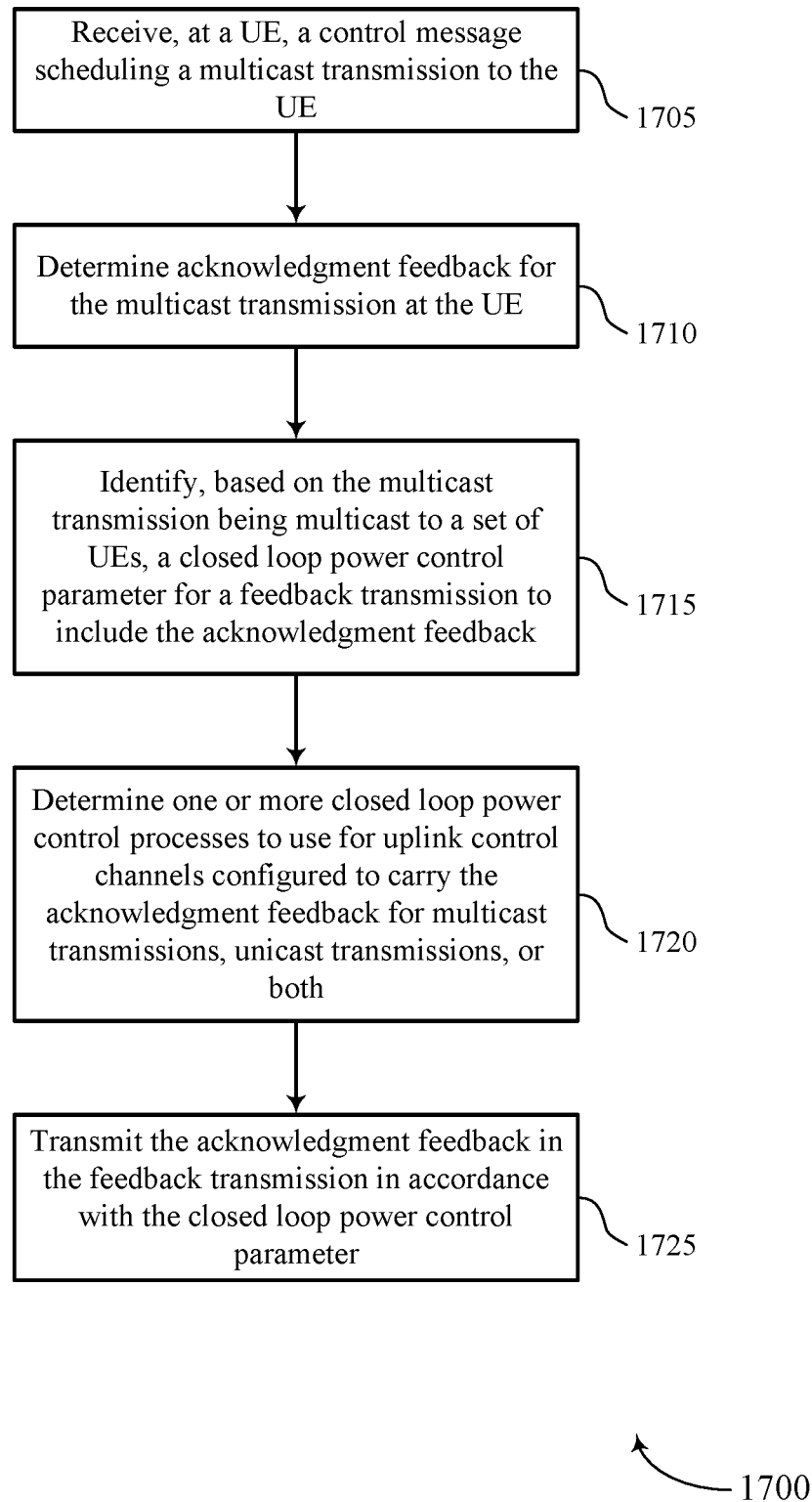

FIG. 17 shows a flowchart illustrating a method 1700 that supports closed loop feedback power control for multicast transmissions in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive, at a UE, a control message scheduling a multicast transmission to the UE. The operations of 1705 may be performed according to the methods described herein. In some examples, aspects of the operations of 1705 may be performed by a multicast scheduling component as described with reference to FIGS. 7 through 10.

At 1710, the UE may determine acknowledgment feedback for the multicast transmission at the UE. The operations of 1710 may be performed according to the methods described herein. In some examples, aspects of the operations of 1710 may be performed by an acknowledgment feedback determination component as described with reference to FIGS. 7 through 10.

At 1715, the UE may identify, based on the multicast transmission being multicast to a set of UEs, a closed loop power control parameter for a feedback transmission to include the acknowledgment feedback. The operations of 1715 may be performed according to the methods described herein. In some examples, aspects of the operations of 1715 may be performed by a closed loop power control parameter identifier as described with reference to FIGS. 7 through 10.

At 1720, the UE may determine one or more closed loop power control processes to use for uplink control channels configured to carry the acknowledgment feedback for multicast transmissions, unicast transmissions, or both. The operations of 1720 may be performed according to the methods described herein. In some examples, aspects of the operations of 1720 may be performed by a closed loop power control parameter identifier as described with reference to FIGS. 7 through 10.

At 1725, the UE may transmit the acknowledgment feedback in the feedback transmission in accordance with the closed loop power control parameter. The operations of 1725 may be performed according to the methods described herein. In some examples, aspects of the operations of 1725 may be performed by an acknowledgment feedback component as described with reference to FIGS. 7 through 10.

Figure 18:
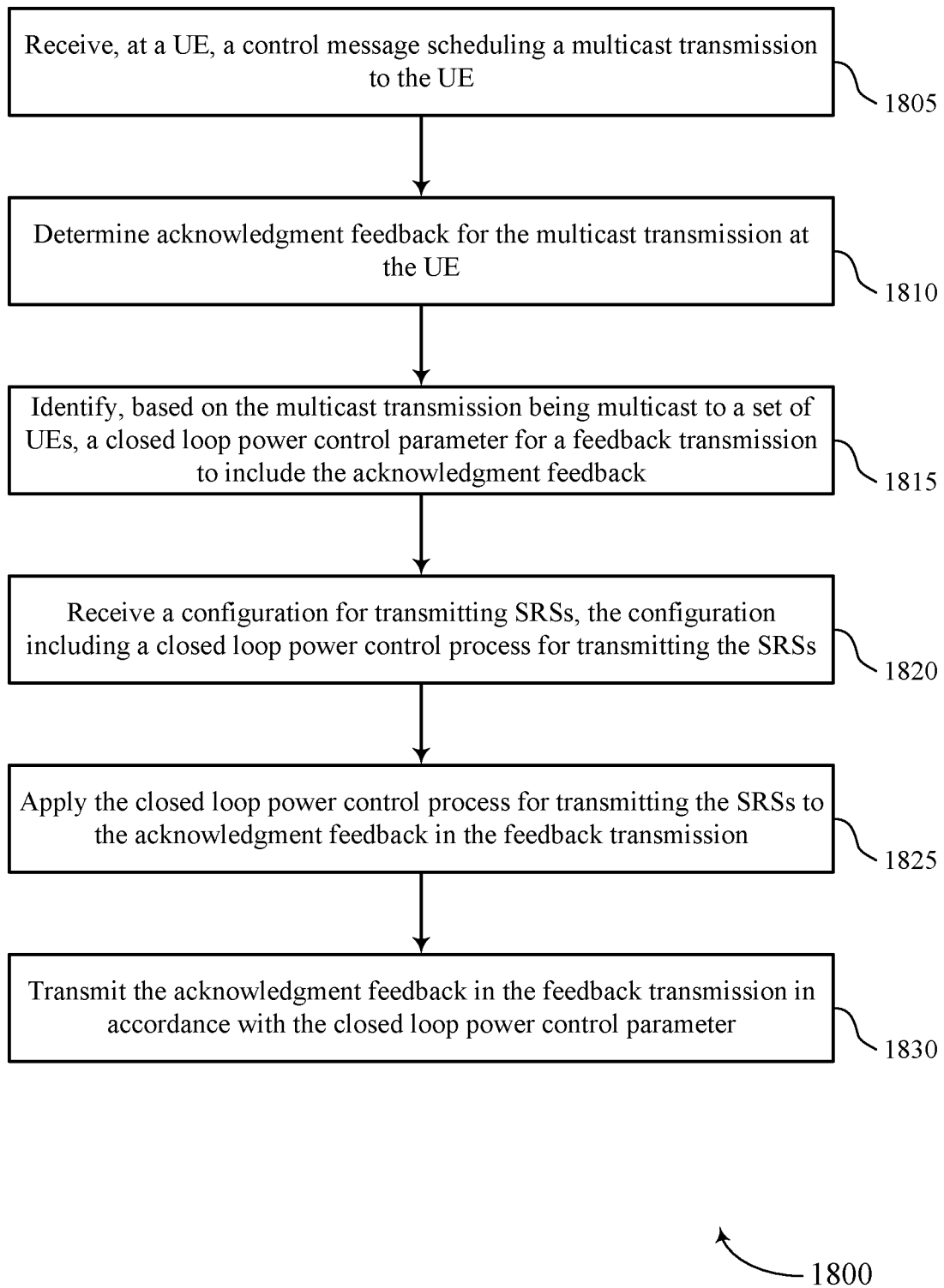

FIG. 18 shows a flowchart illustrating a method 1800 that supports closed loop feedback power control for multicast transmissions in accordance with aspects of the present disclosure. The operations of method 1800 may be implemented by a UE 115 or its components as described herein. For example, the operations of method 1800 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive, at a UE, a control message scheduling a multicast transmission to the UE. The operations of 1805 may be performed according to the methods described herein. In some examples, aspects of the operations of 1805 may be performed by a multicast scheduling component as described with reference to FIGS. 7 through 10.

At 1810, the UE may determine acknowledgment feedback for the multicast transmission at the UE. The operations of 1810 may be performed according to the methods described herein. In some examples, aspects of the operations of 1810 may be performed by an acknowledgment feedback determination component as described with reference to FIGS. 7 through 10.

At 1815, the UE may identify, based on the multicast transmission being multicast to a set of UEs, a closed loop power control parameter for a feedback transmission to include the acknowledgment feedback. The operations of 1815 may be performed according to the methods described herein. In some examples, aspects of the operations of 1815 may be performed by a closed loop power control parameter identifier as described with reference to FIGS. 7 through 10.

At 1820, the UE may receive a configuration for transmitting SRSs, the configuration including a closed loop power control process for transmitting the SRSs. The operations of 1820 may be performed according to the methods described herein. In some examples, aspects of the operations of 1820 may be performed by an SRS configuration component as described with reference to FIGS. 7 through 10.

At 1825, the UE may apply the closed loop power control process for transmitting the SRSs to the acknowledgment feedback in the feedback transmission. The operations of 1825 may be performed according to the methods described herein. In some examples, aspects of the operations of 1825 may be performed by a SRS configuration component as described with reference to FIGS. 7 through 10.

At 1830, the UE may transmit the acknowledgment feedback in the feedback transmission in accordance with the closed loop power control parameter. The operations of 1830 may be performed according to the methods described herein. In some examples, aspects of the operations of 1830 may be performed by an acknowledgment feedback component as described with reference to FIGS. 7 through 10.

Figure 19:
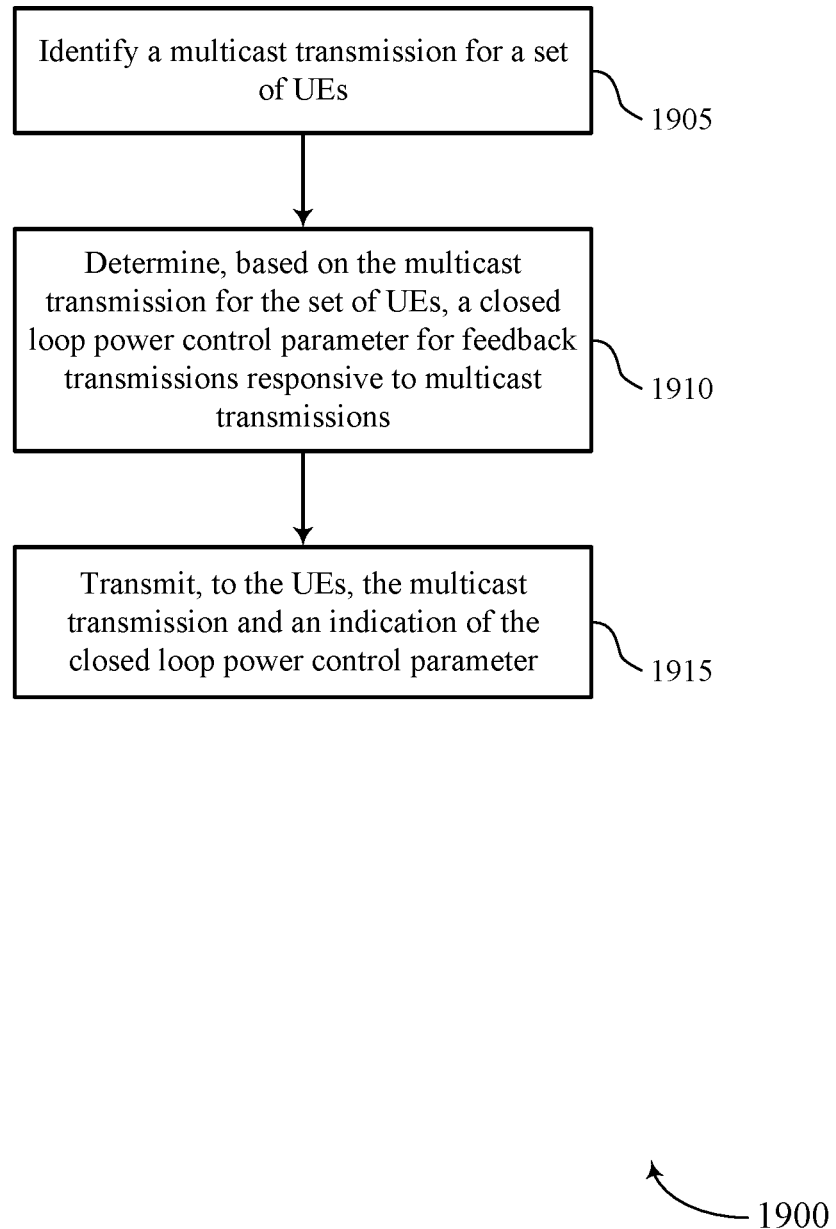

FIG. 19 shows a flowchart illustrating a method 1900 that supports closed loop feedback power control for multicast transmissions in accordance with aspects of the present disclosure. The operations of method 1900 may be implemented by a base station 105 or its components as described herein. For example, the operations of method 1900 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may identify a multicast transmission for a set of UEs. The operations of 1905 may be performed according to the methods described herein. In some examples, aspects of the operations of 1905 may be performed by a multicast identifier as described with reference to FIGS. 11 through 14.

At 1910, the base station may determine, based on the multicast transmission for the set of UEs, a closed loop power control parameter for feedback transmissions responsive to multicast transmissions. The operations of 1910 may be performed according to the methods described herein. In some examples, aspects of the operations of 1910 may be performed by a power control parameter identifier as described with reference to FIGS. 11 through 14.

At 1915, the base station may transmit, to the UEs, the multicast transmission and an indication of the closed loop power control parameter. The operations of 1915 may be performed according to the methods described herein. In some examples, aspects of the operations of 1915 may be performed by a power control parameter indicator as described with reference to FIGS. 11 through 14.

Figure 20:
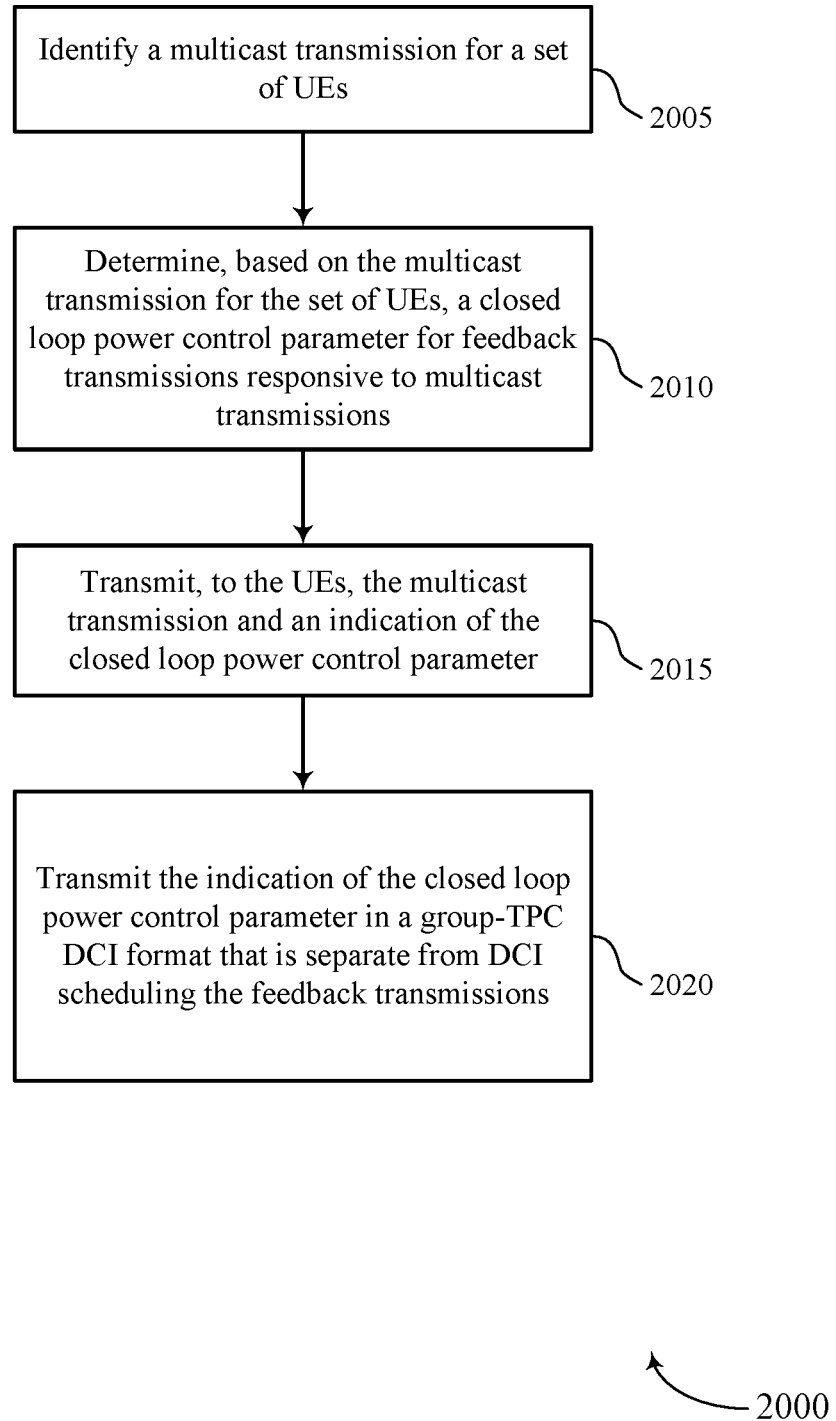

FIG. 20 shows a flowchart illustrating a method 2000 that supports closed loop feedback power control for multicast transmissions in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may identify a multicast transmission for a set of UEs. The operations of 2005 may be performed according to the methods described herein. In some examples, aspects of the operations of 2005 may be performed by a multicast identifier as described with reference to FIGS. 11 through 14.

At 2010, the base station may determine, based on the multicast transmission for the set of UEs, a closed loop power control parameter for feedback transmissions responsive to multicast transmissions. The operations of 2010 may be performed according to the methods described herein. In some examples, aspects of the operations of 2010 may be performed by a power control parameter identifier as described with reference to FIGS. 11 through 14.

At 2015, the base station may transmit, to the UEs, the multicast transmission and an indication of the closed loop power control parameter. The operations of 2015 may be performed according to the methods described herein. In some examples, aspects of the operations of 2015 may be performed by a power control parameter indicator as described with reference to FIGS. 11 through 14.

At 2020, the base station may transmit the indication of the closed loop power control parameter in a group-TPC DCI format that is separate from DCI scheduling the feedback transmissions. The operations of 2020 may be performed according to the methods described herein. In some examples, aspects of the operations of 2020 may be performed by a group-TPC indicator as described with reference to FIGS. 11 through 14.

Figure 21:
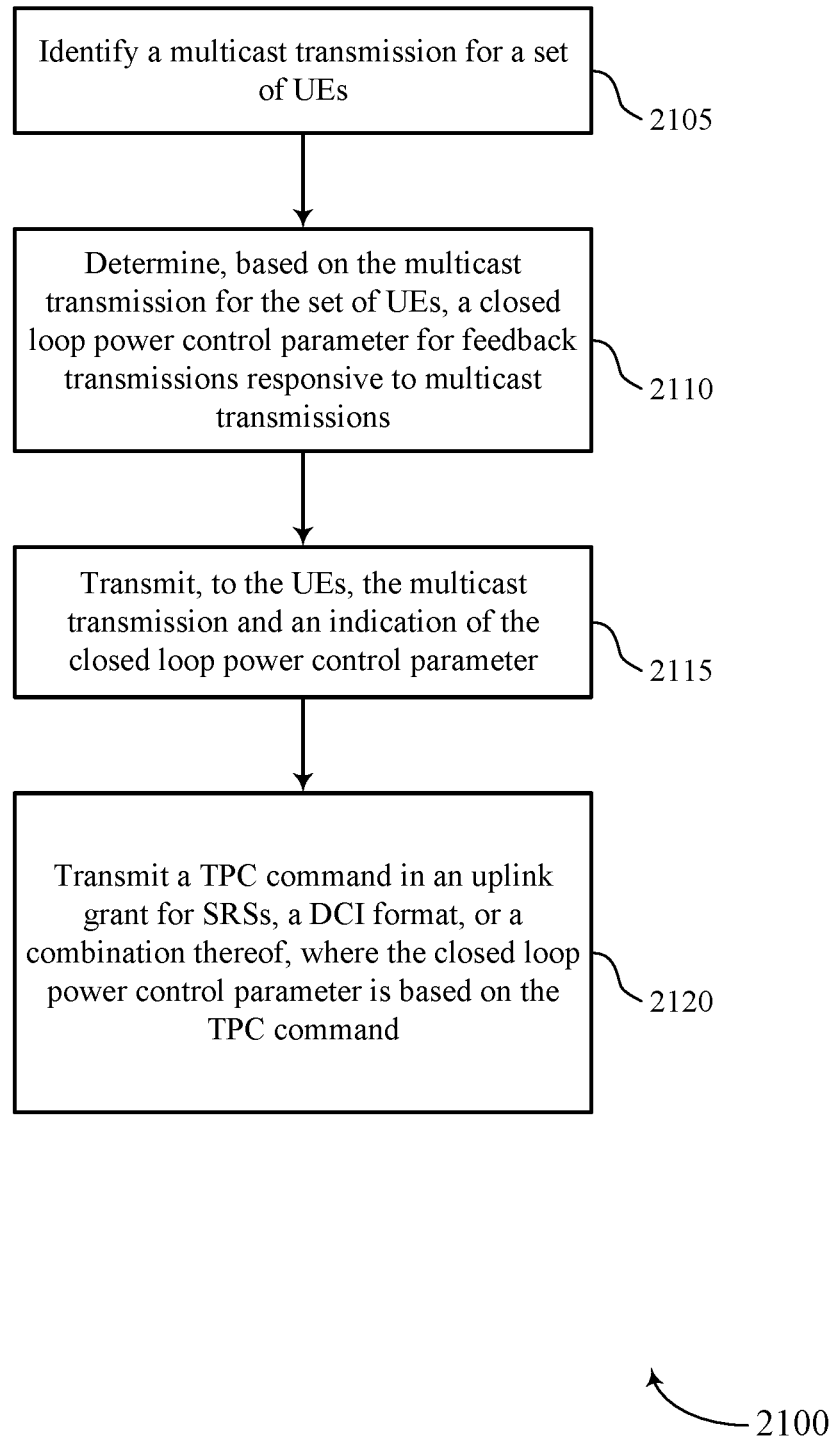

FIG. 21 shows a flowchart illustrating a method 2100 that supports closed loop feedback power control for multicast transmissions in accordance with aspects of the present disclosure. The operations of method 2100 may be implemented by a base station 105 or its components as described herein. For example, the operations of method 2100 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may identify a multicast transmission for a set of UEs. The operations of 2105 may be performed according to the methods described herein. In some examples, aspects of the operations of 2105 may be performed by a multicast identifier as described with reference to FIGS. 11 through 14.

At 2110, the base station may determine, based on the multicast transmission for the set of UEs, a closed loop power control parameter for feedback transmissions responsive to multicast transmissions. The operations of 2110 may be performed according to the methods described herein. In some examples, aspects of the operations of 2110 may be performed by a power control parameter identifier as described with reference to FIGS. 11 through 14.

At 2115, the base station may transmit, to the UEs, the multicast transmission and an indication of the closed loop power control parameter. The operations of 2115 may be performed according to the methods described herein. In some examples, aspects of the operations of 2115 may be performed by a power control parameter indicator as described with reference to FIGS. 11 through 14.

At 2120, the base station may transmit a TPC command in an uplink grant for SRSs, a DCI format, or a combination thereof, where the closed loop power control parameter is based on the TPC command. The operations of 2120 may be performed according to the methods described herein. In some examples, aspects of the operations of 2120 may be performed by a power control parameter indicator as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of examples of the present invention:

Example 1: A method for wireless communications, comprising: receiving, at a user equipment (UE), a control message scheduling a multicast transmission to the UE; determining acknowledgment feedback for the multicast transmission at the UE; identifying, based at least in part on the multicast transmission being multicast to a plurality of UEs, a closed loop power control parameter for a feedback transmission to include the acknowledgment feedback; and transmitting the acknowledgment feedback in the feedback transmission in accordance with the closed loop power control parameter.

Example 2: The method of example 1, wherein identifying the closed loop power control parameter comprises: monitoring a group transmit power control downlink control information message for the closed loop power control parameter, the group transmit power control downlink control information message being different than a scheduling downlink control information for the acknowledgment feedback.

Example 3: The method of any one of examples 1 through 2, wherein identifying the closed loop power control parameter comprises: receiving a group transmit power control downlink control information message; and identifying a plurality of consecutive bits representative of a transmit power control value in the group transmit power control downlink control information message, wherein the closed loop power control parameter is the transmit power control value.

Example 4: The method of example 3, further comprising: receiving a starting position for the plurality of consecutive bits via radio resource control signaling.

Example 5: The method of any one of examples 3 through 4, wherein the plurality of consecutive bits comprises a configured number of bits, and wherein the configured number of bits is two bits or three bits.

Example 6: The method of example 5, further comprising: receiving an indication of the configured number of bits via radio resource control signaling.

Example 7: The method of any one of examples 3 through 6, wherein the plurality of consecutive bits in the downlink control information are received based at least in part on a cyclic redundancy check scrambled by a radio network temporary identifier, the radio network temporary identifier comprising a transmit power control physical uplink control channel radio network temporary identifier, a group radio network temporary identifier, or a combination thereof.

Example 8: The method of any one of examples 3 through 7, wherein the group transmit power control downlink control information message comprises a downlink control information format 2_2.

Example 9: The method of any one of examples 1 through 8, further comprising: determining one or more closed loop power control processes to use for uplink control channels configured to carry the acknowledgment feedback for multicast transmissions, unicast transmissions, or both.

Example 10: The method of any one of examples 1 through 9, wherein the closed loop power control parameter is applied to uplink control channels configured to carry the acknowledgment feedback for multicast transmissions, unicast transmissions, or both.

Example 11: The method of any one of examples 1 through 10, further comprising: receiving a configuration for transmitting sounding reference signals, the configuration comprising a closed loop power control process for transmitting the sounding reference signals; and applying the closed loop power control process for transmitting the sounding reference signals to the acknowledgment feedback in the feedback transmission.

Example 12: The method of example 11, wherein identifying the closed loop power control parameter comprises: receiving a transmit power control command in an uplink grant for the sounding reference signals, a downlink control information format, or a combination thereof and identifying the transmit power control command for transmitting the acknowledgment feedback in the feedback transmission.

Example 13: The method of example 12, wherein the downlink control information format is received based at least in part on a cyclic redundancy check scrambled by a transmit power control sounding reference signal radio network temporary identifier.

Example 14: The method of any one of examples 11 through 13, wherein

Example 15: The method of any one of examples 1 through 14, further comprising: transmitting the acknowledgment feedback for a unicast transmission to the UE; receiving the closed loop power control parameter in a downlink control information scheduling the unicast transmission, a separate downlink control information format for group transmit power control, or a combination thereof; and applying the closed loop power control parameter to the acknowledgment feedback for the unicast transmission.

Example 16: The method of any one of examples 1 through 15, wherein transmitting the acknowledgment feedback in the feedback transmission comprises: transmitting a negative acknowledgment for the acknowledgment feedback; monitoring for downlink control information within a time window, the downlink control information scheduling a retransmission for a same hybrid access response request process associated with the acknowledgment feedback; and increasing a transmit power for a subsequent feedback transmission based at least in part on not receiving the downlink control information within the time window.

Example 17: The method of example 16, further comprising: receiving, via radio resource control signaling, an indication of the time window, an amount for the transmit power increase, or a combination thereof.

Example 18: The method of any one of examples 1 through 17, wherein transmitting the acknowledgment feedback in the feedback transmission comprises: transmitting a positive acknowledgment for the acknowledgment feedback; monitoring for downlink control information within a time window, the downlink control information scheduling a retransmission for a same hybrid access response request process associated with the acknowledgment feedback; and increasing a transmit power for a subsequent feedback transmission based at least in part on receiving the downlink control information within the time window.

Example 19: The method of example 18, further comprising: receiving, via radio resource control signaling, an indication of the time window, an amount for the transmit power increase, or a combination thereof.

Example 20: The method of any one of examples 1 through 19, wherein an uplink control channel carries the acknowledgment feedback for both multicast transmissions and unicast transmissions, and a closed loop power control process for the uplink control channel is applied to either the multicast transmissions or the unicast transmissions.

Example 21: The method of any one of examples 1 through 20, wherein an uplink shared channel carries the acknowledgment feedback for multicast transmissions, and a closed loop power control process for the uplink shared channel is applied to the uplink shared channel.

Example 22: A method for wireless communications, comprising: identifying a multicast transmission for a plurality of user equipments (UEs); determining, based at least in part on the multicast transmission for the plurality of UEs, a closed loop power control parameter for feedback transmissions responsive to multicast transmissions; and transmitting, to the UEs, the multicast transmission and an indication of the closed loop power control parameter.

Example 23: The method of example 22, further comprising: transmitting the indication of the closed loop power control parameter in a group transmit power control downlink control information format that is separate from downlink control information scheduling the feedback transmissions.

Example 24: The method of example 23, further comprising: transmitting, via radio resource control signaling, an indication of a starting position for a plurality of consecutive bits in the group transmit power control downlink control information format, wherein the plurality of consecutive bits conveys the closed loop power control parameter.

Example 25: The method of example 24, wherein the plurality of consecutive bits comprises a configured number of bits, and wherein the configured number of bits is two bits or three bits.

Example 26: The method of example 25, further comprising: transmitting an indication of the configured number of bits via radio resource control signaling.

Example 27: The method of any one of examples 24 through 26, wherein the plurality of consecutive bits in the downlink control information are transmitted based at least in part on a cyclic redundancy check scrambled by a radio network temporary identifier, the radio network temporary identifier comprising a transmit power control physical uplink control channel radio network temporary identifier, a group radio network temporary identifier, or a combination thereof.

Example 28: The method of any one of examples 23 through 27, wherein the group transmit power control downlink control information format comprises a downlink control information format 2_2.

Example 29: The method of any one of examples 22 through 28, further comprising: transmitting a configuration for the plurality of UEs to transmit sounding reference signals comprising a closed loop power control process for transmitting the sounding reference signals, wherein the closed loop power control parameter is based at least in part on the closed loop power control process for transmitting the sounding reference signals.

Example 30: The method of any one of examples 22 through 29, further comprising: transmitting a transmit power control command in an uplink grant for sounding reference signals, a downlink control information format, or a combination thereof, wherein the closed loop power control parameter is based at least in part on the transmit power control command.

Example 31: An apparatus for wireless communications comprising at least one means for performing a method of any one of examples 1 through 21.

Example 32: An apparatus for wireless communications comprising a processor and memory coupled to the processor, the processor and memory configured to perform a method of any one of examples 1 through 21.

Example 34: A non-transitory computer-readable medium storing code for wireless communications, the code comprising instructions executable by a processor to perform a method of any one of examples 1 through 21.

Example 35: An apparatus for wireless communications comprising at least one means for performing a method of any one of examples 22 through 30.

Example 36: An apparatus for wireless communications comprising a processor and memory coupled to the processor, the processor and memory configured to perform a method of any one of examples 22 through 30.

Example 38: A non-transitory computer-readable medium storing code for wireless communications, the code comprising instructions executable by a processor to perform a method of any one of examples 22 through 30.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications, comprising:
   receiving, at a user equipment (UE), a control message scheduling a multicast transmission to the UE;
   determining acknowledgment feedback for the multicast transmission at the UE;
   monitoring, based at least in part on the multicast transmission being multicast to a plurality of UEs, for a group transmit power control downlink control information message of downlink control information format 2_2 that comprises a plurality of consecutive bits with a bit size of two bits or three bits, wherein the plurality of consecutive bits with the bit size of two or three bits within the group transmit power control downlink control information message of downlink control information format 2_2 indicates a closed loop power control parameter that is for both unicast and multicast communications and is for a feedback transmission to include the acknowledgment feedback;
   receiving, based at least in part on the monitoring, the group transmit power control downlink control information message of downlink control information format 2_2 that indicates the closed loop power control parameter;
   transmitting the acknowledgment feedback in the feedback transmission in accordance with the closed loop power control parameter;
   monitoring for downlink control information within a time window, the downlink control information scheduling a retransmission associated with a same hybrid access response request process as the acknowledgment feedback; and
   increasing a transmit power for a subsequent feedback transmission based at least in part on whether the downlink control information scheduling the retransmission is received within the time window.

2. The method of claim 1, wherein the plurality of consecutive bits is representative of a transmit power control value in, and wherein the closed loop power control parameter is the transmit power control value.

3. The method of claim 2, further comprising:
   receiving a starting position for the plurality of consecutive bits via radio resource control signaling.

4. The method of claim 1, further comprising:
   receiving an indication of the bit size of the plurality of consecutive bits via radio resource control signaling.

5. The method of claim 2, wherein the plurality of consecutive bits in the group transmit power control downlink control information message are received based at least in part on a cyclic redundancy check scrambled by a radio network temporary identifier, the radio network temporary identifier comprising a transmit power control physical uplink control channel radio network temporary identifier, a group radio network temporary identifier, or a combination thereof.

6. The method of claim 1, further comprising:
   determining one or more closed loop power control processes to use for uplink control channels configured to carry the acknowledgment feedback for multicast transmissions, unicast transmissions, or both.

7. The method of claim 1, wherein the closed loop power control parameter is applied to uplink control channels configured to carry the acknowledgment feedback for multicast transmissions, unicast transmissions, or both.

8. The method of claim 1, further comprising:
   receiving a configuration for transmitting sounding reference signals, the configuration comprising a closed loop power control process for transmitting the sounding reference signals; and
   applying the closed loop power control process for transmitting the sounding reference signals to the acknowledgment feedback in the feedback transmission.

9. The method of claim 1, wherein the acknowledgment feedback in the feedback transmission comprises a negative acknowledgment, and wherein increasing the transmit power for the subsequent feedback transmission is based at least in part on not receiving the downlink control information within the time window.

10. The method of claim 9, further comprising:
    receiving, via radio resource control signaling, an indication of the time window, an amount for the transmit power increase, or a combination thereof.

11. The method of claim 1, wherein the acknowledgment feedback in the feedback transmission comprises a positive acknowledgment, and wherein increasing the transmit power for the subsequent feedback transmission is based at least in part on receiving the downlink control information within the time window.

12. The method of claim 11, further comprising:
receiving, via radio resource control signaling, an indication of the time window, an amount for the transmit power increase, or a combination thereof.

13. The method of claim 1, wherein an uplink control channel carries the acknowledgment feedback for both multicast transmissions and unicast transmissions, and a closed loop power control process for the uplink control channel is applied to either the multicast transmissions or the unicast transmissions.

14. The method of claim 1, wherein an uplink shared channel carries the acknowledgment feedback for multicast transmissions, and a closed loop power control process for the uplink shared channel is applied to the uplink shared channel.

15. A method for wireless communications, comprising:
identifying a multicast transmission for a plurality of user equipments (UEs);
determining, based at least in part on the multicast transmission for the plurality of UEs, a closed loop power control parameter that is for feedback transmissions responsive to both unicast and multicast transmissions, wherein the closed loop power control parameter is associated with the plurality of UEs;
transmitting, to the plurality of UEs, a control message scheduling the multicast transmission;
transmitting a group transmit power control downlink control information message of downlink control information format 2_2 that comprises a plurality of consecutive bits with a bit size of two bits or three bits, wherein the plurality of consecutive bits with the bit size of two or three bits within the group transmit power control downlink control information message of downlink control information format 2_2 indicates the closed loop power control parameter that is for both unicast and multicast communications, wherein the closed loop power control parameter is for a feedback transmission to include acknowledgment feedback for the multicast transmission;
transmitting downlink control information scheduling a retransmission associated with a same hybrid access response request process as the acknowledgment feedback, wherein the downlink control information scheduling the retransmission is associated with an increase in transmit power for a subsequent feedback transmission for at least one UE of the plurality of UEs, and wherein the increase in transmit power associated with the downlink control information is based at least in part on whether the downlink control information is received by the at least one UE within a time window; and
receiving, based at least in part on the multicast transmission being multicast to a plurality of UEs and further based at least in part on transmitting the group transmit power control downlink control information message of downlink control information format 2_2 that indicates the closed loop power control parameter and transmitting the downlink control information scheduling the retransmission, the subsequent feedback transmission, wherein the subsequent feedback transmission is associated with a transmit power that is based at least in part on the closed loop power control parameter and is further based at least in part on the increase in transmit power associated with the downlink control information scheduling the retransmission.

16. The method of claim 15, further comprising:
transmitting, via radio resource control signaling, an indication of a starting position for the plurality of consecutive bits in the group transmit power control downlink control information message, wherein the plurality of consecutive bits conveys a plurality of closed loop power control parameters that includes the closed loop power control parameter.

17. The method of claim 15, further comprising:
transmitting a configuration for the plurality of UEs to transmit sounding reference signals comprising a closed loop power control process for transmitting the sounding reference signals, wherein a plurality of closed loop power control parameters that includes the closed loop power control parameter are based at least in part on the closed loop power control process for transmitting the sounding reference signals.

18. An apparatus for wireless communications, comprising: at least one processor, memory coupled with the at least one processor; and instructions stored in the memory and executable by the at least one processor to cause the apparatus to:
receive, at a user equipment (UE), a control message scheduling a multicast transmission to the UE;
determine acknowledgment feedback for the multicast transmission at the UE;
monitor, based at least in part on the multicast transmission being multicast to a plurality of UEs, for a group transmit power control downlink control information message of downlink control information format 2_2 that comprises a plurality of consecutive bits with a bit size of two bits or three bits, wherein the plurality of consecutive bits with the bit size of two or three bits within the group transmit power control downlink control information message of downlink control information format 2_2 indicates a closed loop power control parameter that is for both unicast and multicast communications and is for a feedback transmission to include the acknowledgment feedback;
receive, based at least in part on the monitoring, the group transmit power control downlink control information message of downlink control information format 2_2 that indicates the closed loop power control parameter;
transmit the acknowledgment feedback in the feedback transmission in accordance with the closed loop power control parameter;
monitor for downlink control information within a time window, the downlink control information scheduling a retransmission associated with a same hybrid access response request process as the acknowledgment feedback; and
increase a transmit power for a subsequent feedback transmission based at least in part on whether the downlink control information scheduling the retransmission is received within the time window.

19. The apparatus of claim 18, wherein
the plurality of consecutive bits is representative of a transmit power control value, and wherein the closed loop power control parameter is the transmit power control value.

20. An apparatus for wireless communications, comprising:
at least one processor, memory coupled with the at least one processor; and instructions stored in the memory and executable by the at least one processor to cause the apparatus to:

identify a multicast transmission for a plurality of user equipments (UEs);

determine, based at least in part on the multicast transmission for the plurality of UEs, a closed loop power control parameter that is for feedback transmissions responsive to both unicast and multicast transmissions, wherein the closed loop power control parameter is associated with the plurality of UEs;

transmit, to the plurality of UEs, a control message scheduling the multicast transmission;

transmit a group transmit power control downlink control information message of downlink control information format 2_2 that comprises a plurality of consecutive bits with a bit size of two bits or three bits, wherein the plurality of consecutive bits with the bit size of two or three bits within the group transmit power control downlink control information message of downlink control information format 2_2 indicates the closed loop power control parameter that is for both unicast and multicast communications, wherein the closed loop power control parameter is for a feedback transmission to include acknowledgment feedback for the multicast transmission;

transmit downlink control information scheduling a retransmission associated with a same hybrid access response request process as the acknowledgment feedback, wherein the downlink control information scheduling the retransmission is associated with an increase in transmit power for a subsequent feedback transmission for at least one UE of the plurality of UEs, and wherein the increase in transmit power associated with the downlink control information is based at least in part on whether the downlink control information is received by the at least one UE within a time window; and receive, based at least in part on the multicast transmission being multicast to a plurality of UEs and further based at least in part on transmitting the group transmit power control downlink control information message of downlink control information format 2_2 that indicates the closed loop power control parameter and transmitting the downlink control information scheduling the retransmission, the subsequent feedback transmission, wherein the subsequent feedback transmission is associated with a transmit power that is based at least in part on the closed loop power control parameter and is further based at least in part on the increase in transmit power associated with the downlink control information scheduling the retransmission.

* * * * *